United States Patent
Goyal et al.

(10) Patent No.: US 11,995,158 B2
(45) Date of Patent: May 28, 2024

(54) TECHNIQUES FOR PREDICTING LEAKAGE OF A SERIAL NUMBER

(71) Applicant: Adobe Inc., San Jose, CA (US)

(72) Inventors: Sachin Goyal, Haryana (IN); Harsh Agarwal, New Delhi (IN); Cyril Thomas, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 17/193,251

(22) Filed: Mar. 5, 2021

(65) Prior Publication Data
US 2022/0284079 A1    Sep. 8, 2022

(51) Int. Cl.
  *G06F 21/12* (2013.01)
  *G06F 21/10* (2013.01)
  *G06F 21/16* (2013.01)
  *G06F 21/55* (2013.01)
  *G06F 21/73* (2013.01)

(52) U.S. Cl.
  CPC .............. *G06F 21/12* (2013.01); *G06F 21/16* (2013.01); *G06F 21/552* (2013.01); *G06F 21/73* (2013.01); *G06F 21/107* (2023.08)

(58) Field of Classification Search
  CPC ........ G06F 21/12; G06F 21/16; G06F 21/552; G06F 21/73; G06F 21/0751
  See application file for complete search history.

(56) References Cited

U.S. PATENT DOCUMENTS

| 6,801,822 B1* | 10/2004 | Fujiwara ......... G05B 19/41875 |
| | | 707/999.107 |
| 9,836,730 B1* | 12/2017 | Metrailler ......... G06Q 20/1235 |
| 2004/0002369 A1* | 1/2004 | Walker .................. A63F 13/46 |
| | | 463/1 |

(Continued)

FOREIGN PATENT DOCUMENTS

CN    109388915 B  *  2/2021  ........... G06F 21/121

OTHER PUBLICATIONS

Hui Xu • Yangfan Zhou • Cuiyun Gao • Yu Kang • Michael R. Lyu; SpyAware: Investigating the privacy leakage signatures in app execution traces; 2015 IEEE 26th International Symposium on Software Reliability Engineering (ISSRE) (pp. 348-358); (Year: 2015).*

(Continued)

*Primary Examiner* — Luu T Pham
*Assistant Examiner* — Chao Wang
(74) *Attorney, Agent, or Firm* — FINCH & MALONEY PLLC

(57) ABSTRACT

Techniques are provided herein for tracking activation events associated with a given serial number and using the data from the activation events to autonomously determine whether the serial number has been leaked. Numerous different characteristic parameters of activation events collected over a given time period for a serial number can be tracked and stored in a database. A plurality of different input variables can be generated based on the characteristic (Continued)

parameter data, which create the inputs that are used by a trained neural network to determine the leakage probability. If the leakage probability is determined to be above a certain threshold, an alert of some kind can be generated to indicate that the serial number has been leaked.

16 Claims, 15 Drawing Sheets

(56) References Cited

U.S. PATENT DOCUMENTS

| | | | |
|---|---|---|---|
| 2012/0131349 A1* | 5/2012 | Layson | G06F 21/121 |
| | | | 713/182 |
| 2014/0286193 A1* | 9/2014 | Ghaboosi | H04W 8/186 |
| | | | 370/254 |
| 2017/0032130 A1* | 2/2017 | Joseph Durairaj | |
| | | | H04L 63/1416 |
| 2018/0069710 A1* | 3/2018 | De Langen | H04L 9/14 |

OTHER PUBLICATIONS

Tianchang Yang • Haoliang Cui • Shaozhang Niu • Peng Zhang; An analysis on sensitive data passive leakage in Android applications; 2015 IEEE 16th International Conference on Communication Technology (ICCT) (pp. 125-131); (Year: 2015).*

M. Takesue ; A Scheme for Protecting the Information Leakage Via Portable Devices; The International Conference on Emerging Security Information, Systems, and Technologies (SECUREWARE 2007) (pp. 54-59); (Year: 2008).*

* cited by examiner

TECHNIQUES FOR PREDICTING LEAKAGE OF A SERIAL NUMBER

FIELD OF THE DISCLOSURE

This disclosure relates to anti-piracy techniques, and more particularly to techniques for using serial number activation event data to determine if a given serial number has been leaked (e.g., is being used without authorization).

BACKGROUND

A serial number, sometimes called a product key or license code, is unique data string or identifier (e.g., a relatively long alpha-numeric or code) that allows a user to activate usage rights for a purchased software application or service. Serial numbers were the most popular way of selling desktop software licenses until more recently when online software sales came to popularity where a user downloads or otherwise accesses purchased software via a remote server of the software seller. In such cases, email identification of the customer is used, rather than having the user enter the serial number during a desktop install process. However, emails are often still mapped to a serial number on the server. In such cases, the serial number is abstracted from the end user. Today, there are millions of serial numbers that companies use regularly to activate software. The serial numbers may be used for activation of both individual licenses and enterprise licenses. A fundamental problem with using a serial number to activate a software license is that the serial number cannot uniquely identify the end customer as there is no authentication process beyond using the serial number itself. Accordingly, it becomes relatively easy for non-paying or otherwise unlicensed customers to access known serial numbers and use them to activate the software without proper license to do so. When a serial number is used in this way to activate software for unlicensed (illegal) use, the serial number is considered to have been leaked. A simple web browser search provides innumerous readily available leaked serial numbers for a variety of different popular software applications. Since the serial number activation itself cannot determine how the software was obtained, it is very difficult to determine if a serial number has been leaked. Therefore, complex and non-trivial issues associated with identifying leaked serial numbers remain.

SUMMARY

Techniques are provided herein for tracking activation events associated with a given serial number and using the data from the activation events to autonomously determine whether the serial number has been leaked. As used herein, an activation event refers to an attempt from any computing device to use a given serial number to activate some piece of software. Numerous different characteristic parameters of activation events collected over a given time period for a serial number can be tracked and stored in a database. Examples of such characteristic parameters include, for instance, a machine ID (e.g., MAC address or portion of a MAC address) associated with an activation event, an IP address associated with an activation event, a number of machines using the IP address, a city where an activation event occurred, or a country where an activation event occurred. A plurality of different input variables can be generated based on the characteristic parameter data, which create the inputs that are used by a predictive model to determine the leakage probability. These input variables represent different statistical features of the collection of activation events over the given period of time that can suggest whether or not the serial number is being used illegally. For example, one of the input variables may be a total number of unique countries from where activation events have been received. A high number of different countries could suggest possible leakage of the serial number. Likewise, a certain geographic location being associated with a relatively low number of activations relative to other geographic locations (e.g., below a pre-established threshold) could suggest possible leakage of the serial number. Many other types of input variables are also generated as will be disclosed in more detail herein. All of the generated input variables can be fed into a neural network that is trained to identify patterns in the input variables and determine a probability that the serial number has been leaked. The neural network may be trained in a supervised fashion, using similar input variable data from a large set of known serial numbers, with at least those serial numbers that are known to be leaked being labeled as such. If the leakage probability is determined to be above a certain threshold, an alert (e.g., email or other report) can be generated to indicate that the serial number has been leaked. In some embodiments, the serial number may also be considered leaked if the determined leakage probability is a certain degree higher compared to an earlier determined leakage probability for the same serial number. Numerous variations and embodiments of the disclosed techniques will be appreciated in light of this disclosure.

Any number of non-transitory machine-readable mediums (e.g., embedded memory, on-chip memory, read only memory, random access memory, solid state drives, and any other physical storage mediums) can be encoded with instructions that, when executed by one or more processors, cause an embodiment of the techniques provided herein to be carried out, thereby allowing for a determination of whether a serial number has been leaked. Likewise, the techniques can be implemented in hardware (e.g., logic circuits such as field programmable gate array, purpose-built semiconductor, microcontroller with a number of input/output ports and embedded routines). Numerous embodiments will be apparent in light of this disclosure.

DETAILED DESCRIPTION

Figure 1:
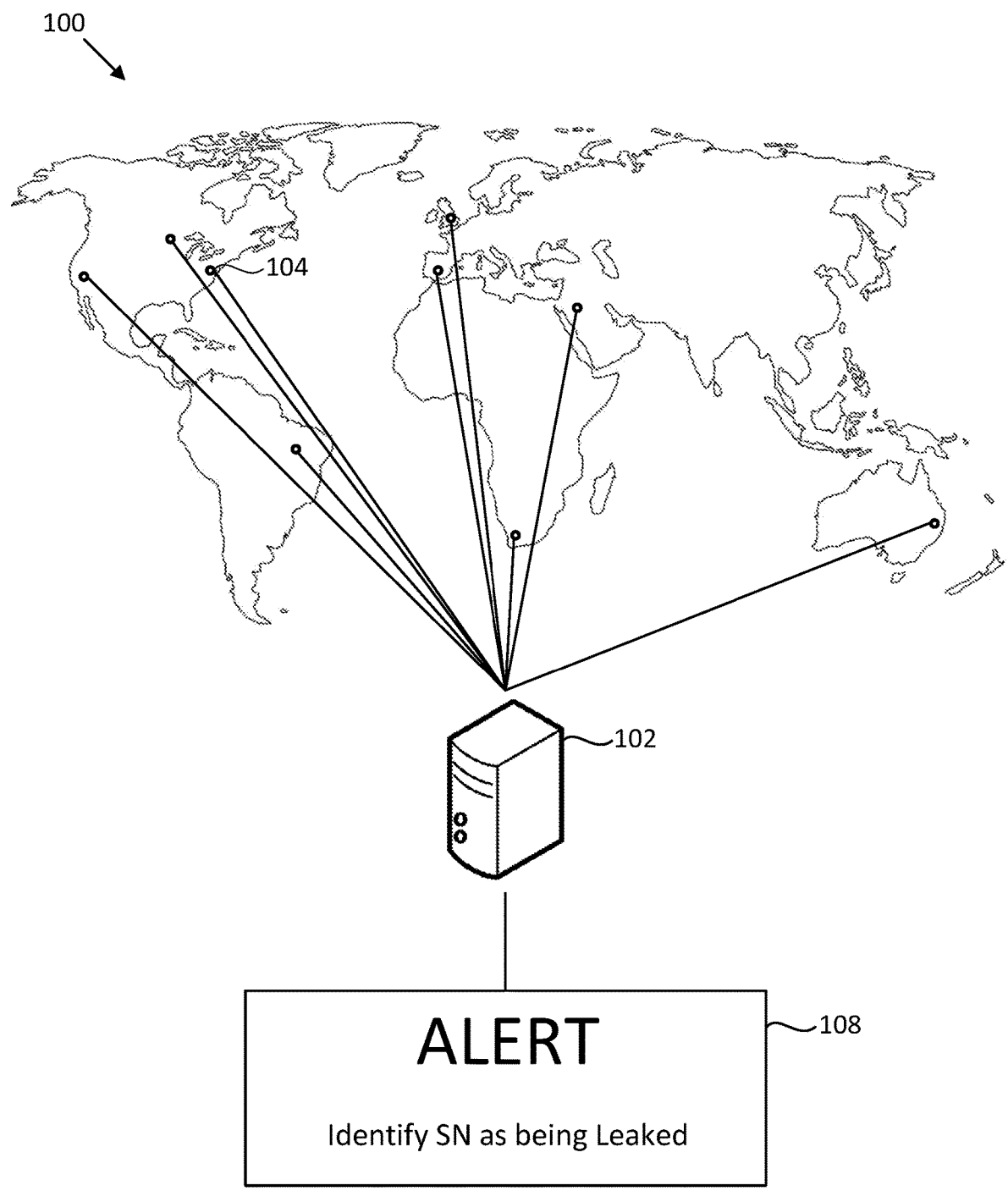
FIG. 1 shows an example use case of an anti-piracy system receiving activation events for access to software from around the world for a given software serial number, according to an embodiment of the present disclosure.

Techniques are provided herein for determining whether or not a given software serial number (SN) has been leaked based on its activation event data. Each time an activation event occurs for the SN, data about the event is received as well, such as the IP address and machine ID of the computer activating the SN, as well as geographic data (country, city, etc.) about the location of the activation event. According to some embodiments, the various characteristic parameters of the activation events for a given serial number are analyzed to generate different input variables, which represent different aspects that impact the likelihood that the SN has been leaked. For example, one input variable may be a count of the number of unique countries that activated the SN while other input variables may be counts of the number of activations that occurred using free domains (e.g., domains associated with private email addresses such as @gmail.com) vs. enterprise domains (e.g., domains associated with work email addresses). According to some embodiments, each of the generated input variables is fed into a neural network that uses the values of the input variables to output a leakage probability (e.g., on a scale from 0-1) for the given SN. The neural network may be any type of deep neural network (DNN) that is trained in a supervised fashion using a training set that includes at least known leaked SNs that are labeled as being leaked. If the generated leaked probability is higher than a given threshold, an alert can be generated to indicate that the SN has been leaked. In some embodiments, an alert can also be generated if the leakage probability increases a certain amount above an earlier determined leakage probability for the same SN. In any case, the alert can be received by the company that disseminated the SN for their software product.

As will be appreciated, the techniques disclosed herein can be used for any serial numbers for any type of software. As used herein, the term serial number can represent any type of identification used to electronically validate a purchase or activate a product. Accordingly, serial numbers can be product keys, activation keys, license codes, usernames, user email addresses, or hardware identifiers like MAC addresses, to name a few examples. A software serial number may include a string of numbers only, a string that includes both numbers and letters, or a string of any ASCII characters. The software product being activated may be, for example, installed directly on a user's computing device (or otherwise downloadable), or may be remotely accessed from a cloud-based service that provides user access to the licensed software product via online subscription. In some cases, it is possible that the software product may be partially hosted on a user's device and partially hosted on the software provider's server. Any number of arrangements can benefit from the techniques provided herein.

General Overview

Companies that offer software products may have multiple different software suites with many different known serial numbers that can be used to activate any of the software products. End-user computing devices from anywhere in the world can receive a SN inputted by a user to activate the use of one of the software products on that computing device. Such activation events can be received by a server (e.g., webserver) affiliated with the company that makes, or otherwise controls licensing of, the software product being activated. If the SN associated with the activation event is correct, the server returns an approval to the end-user computing device that activated the SN. This approval process performed by the server only determines whether the received SN matches any of the known SNs issued for the given software product and does not have any way of knowing whether the received SN is attempting to activate software that was not officially licensed for use by that user (e.g., illegally obtained or stolen, or simply provided by another licensed user without thought as to the legality). However, since techniques disclosed herein can be used to determine that a given SN has been leaked, that given SN can be shut down such that any future activation attempts for that SN will cause the server to transmit a rejection as opposed to an approval.

As described herein, a wealth of data can be collected across multiple activation events for a given SN. Such data on its own does not present a clear picture of whether the SN has been leaked. However, by leveraging the adaptable learning capability of a neural network, the disclosed techniques harness the collected data and provide a meaningful probability that the SN has been leaked. In order to provide useful inputs to the neural network, the disclosed techniques can be used to generate a variety of different input variables based on the collected event activation event data that represent different aspects of the activation events (e.g., geographic data, user machine data, domain data, etc.).

The techniques may be embodied in devices, systems, methods, or machine-readable mediums, as will be appreciated. For example, according to a first embodiment of the present disclosure, a system is provided that is configured to identify a leaked serial number associated with a software product. The system includes at least one processor and one or more modules executable by the processor(s) to carry out the SN leakage determination process. The module(s) according to one such embodiment include an event collection module, a variable generation module, a leakage detection module, and an output module. The event collection module is programmed or otherwise configured to track a plurality of characteristic parameters for activation events that occur over a period of time. An activation event corresponds to a software activation request using a given serial number. Each of the characteristic parameters is trackable for the given serial number and corresponds to an aspect of the activation events. The variable generation module is programmed or otherwise configured to generate a plurality of input variables associated with the given serial number. Each of the input variables is based on one or more of the plurality of characteristic parameters, where at least one of the input variables includes a count corresponding to a number of activation events associated with one of the characteristic parameters. The leakage detection module is programmed or otherwise configured to provide the plurality of input variables as inputs to a neural network, and generate, using the neural network, a leakage probability for the given serial number based on the inputs. The output module is programmed or otherwise configured to, in response to the leakage probability being above a threshold, generate an alert indicating that the leakage probability is above the threshold. The alert may be sent, for example, to any number of different networked computers and/or electronic mail addresses, so interested parties can take remedial action. The alert includes at least some indication of the SN that is determined to be leaked and may include information regarding any of the input variables or characteristic parameters used to determine that the SN is leaked. The remedial action may include, for instance, deactivating the serial number and/or attempting to convert the unlicensed user to a licensed user.

According to another embodiment of the present disclosure, a method for identifying a leaked serial number associated with a software product is provided. The method includes: tracking a plurality of characteristic parameters for activation events that occur over a period of time, wherein an activation event corresponds to a software activation request using a given serial number, each of the characteristic parameters being trackable for the given serial number and corresponding to an aspect of the activation events; generating a plurality of input variables associated with the given serial number, each of the input variables based on one or more of the plurality of characteristic parameters, wherein at least one of the input variables includes a count corresponding to a number of activation events associated with one of the characteristic parameters; providing the plurality of input variables as inputs to a neural network; generating, using the neural network, a leakage probability for the given serial number based on the inputs; and in response to the leakage probability being above a threshold, generating an alert indicating that the leakage probability is above the threshold. As will be appreciated, any accessibility tools can be used to provide the alert across any number of computing devices, according to some embodiments.

Numerous examples are described herein, and many others will be appreciated in light of this disclosure.

Example of Serial Number Activation Events

FIG. 1 illustrates an activation event scenario 100 where activation events for a particular software serial number (SN) are collected from different locations around the world. Each of the circles on the map represents a city from which activation events are received. That is, computing devices in these cities are attempting to input the SN to activate a software product. These different activation requests are received by one or more servers 102 that process the requests and either approve or reject the received activation request. As noted above, the request is approved if the received SN matches a list of approved SNs for the software being activated.

Any number of activation requests can be received from any city or location. Furthermore, according to some embodiments, activation requests from around the world can be received over a given period of time, and the data from all of the collected activation events is used to determine whether or not the SN has been leaked. In the illustrated example of FIG. 1, activation events received from New York City 104 may not be seen as troublesome as it is very probable that enterprise licenses are used by many companies based in New York City. However, activation events received from a location where there is little enterprise activity or that is known for high rates of piracy may be a cause for concern. Depending on the software being activated, it may be unlikely that such locations would have users that legally obtained the SN. However, these activations alone may not be enough to warrant a determination that the SN has been leaked as many other factors must also be considered, as will be discussed in more detail herein.

According to some embodiments, server 102 may represent a single centralized server device or centralized server farm or data center, or it may represent any number of distributed servers or data centers from around the world. According to some embodiments, server 102 collects the data from the activation events for the given SN over time and analyzes all of the data collected up to whenever a determination is made regarding whether the SN has been leaked. For example, server 102 may make the leakage determination twice a week, which breaks down into about 3.5 days of additional data collection from received activation events each time a leakage determination is made. In some embodiments, a threshold can be set, and a notification can be sent when the number of activations received for a given serial number exceeds that threshold. This latter approach provides a more dynamic approach as to when data analysis can commence.

According to some embodiments, if server 102 determines a leakage probability for the SN that is above a certain threshold, then server 102 can issue an alert 108 to indicate that the SN has likely been leaked. Alert 108 can be manifested in any number of different ways. In some examples, alert 108 includes automatic email alerts sent to one or more personnel of the company that disseminated the SN or to one or more personnel who are involved with monitoring SN use. In some examples, alert 108 automatically generates a SN leakage report that includes the determined probability that the SN has been leaked along with any of the data that was used in making the determination. In some embodiments, alert 108 is sent to one or more forensic experts that specialize in data pirating who make the final determination on whether SN has been leaked based on the information provided as part of alert 108. In some embodiments, alert 108 may include flagging the SN as being "likely" leaked within server 102 such that any further activation requests received for the SN are automatically rejected. In some situations, the SN continues to be flagged as likely leaked in server 102 at least until a forensic expert can review the leakage data to make the final conclusion on whether the SN should be discontinued or not. In still further embodiments, a marketing campaign can be launched that targets unlicensed users of the leaked serial number for conversion to licensed users.

System Architecture

Figure 2:
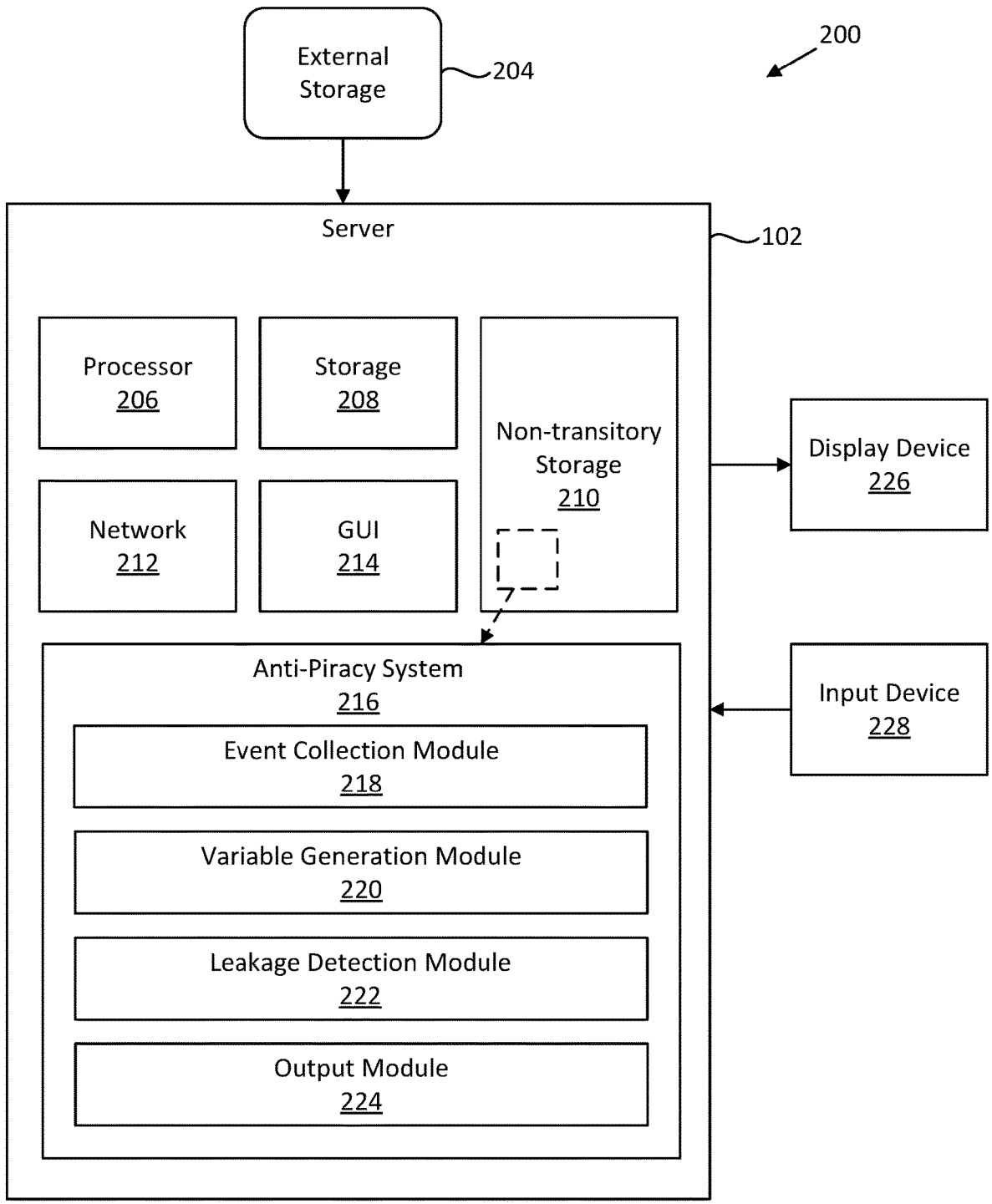
FIG. 2 shows an example computing system programmed or otherwise configured with an anti-piracy system for detecting leaked software serial numbers, in accordance with an embodiment of the present disclosure.

FIG. 2 shows an example system 200 that, among other things, implements an anti-piracy system 216 to determine a leakage probability for a software serial number (SN) based on activation event data associated with that SN, according to an embodiment of the present disclosure. As can be seen, system 200 includes server 102 and external storage 204 that are communicatively coupled via a network or other suitable connection. Server 102 includes a processor 206, a storage 208, a non-transitory storage medium 210, a network interface 212, and a graphical user interface (GUI) 214. As can be further seen, server 102 further includes anti-piracy system 216, which in this example embodiment is an application stored in non-transitory storage medium 210 (as shown with dashed lines), and executable by processor 206. A display device 226 and input device 228 are operatively coupled with the server. As will be further appreciated in light of this disclosure, anti-piracy system 216 may be part of a broader software validation system, and server 102 may also carry out any number of other standard or proprietary server functions. The present disclosure focuses on aspects and functionality of anti-piracy system 216.

External storage 204 can be, for instance, a storage for activation event data collected by server 102 server, as well as any other analytics. In addition, storage 204 can be used to store licensing data, such as lists of active valid SNs and known invalid SNs. An administrator or user of server 102 can update, maintain or otherwise monitor these lists, for instance, based on the output of anti-piracy system 216. Other embodiments may store such data onboard server 102. Note that storage 204 can be local to server 102 (e.g., connected via USB, Ethernet or local wireless network) or remote to server 102 (e.g., connected via wide area network). In any such cases, server 102 can, for example, reject validation requests that are associated with a known invalid SN, and approve validation requests that are associated with a known valid SN.

Processor 206 can access and execute instructions or software stored in non-transitory computer-readable medium 210 and other programs for controlling system hardware and functionality of server 102. Processor 206 may have multiple cores to facilitate parallel processing or may be multiple single core processors. Any number of processor architectures can be used (e.g., central processing unit and co-processor, graphics processor, digital signal processor). In this example embodiment, processor 206 is configured to execute the modules of anti-piracy system 216, which include event collection module 218, variable generation module 220, leakage detection module 222, and output module 224. Each of these modules is described in further detail below.

Storage 208 is also accessible to processor 206 and can be used for storing any type of files and information (e.g., activation event data, valid SNs, invalid SNs, and reporting templates), and may include any number of suitable memory technologies, such as RAM, ROM, Flash, a hard-drive or disc drive, or other machine-readable mediums. Non-transitory computer-readable medium 210 can include similar types of memory (e.g., RAM, ROM, etc.), and in some cases includes memory that is on-board processor 206. As previously explained, non-transitory computer-readable medium 210 stores executable instructions or software for implementing various embodiments (such as instructions for an operating system as well as anti-piracy system 216).

Network interface 212 can include any appropriate network chip or chipset or card which allows for wired or wireless connection between server 102 and a communication network with which server 102 is connected (such as a local area network and the Internet). Other computing devices and resources can access server 102 via that network, and vice-versa. GUI 214 may include, for instance, a touch-based user interface that leverages a touchscreen display (such as display device 226). In some such embodiments, the touch-based user interface may be used, for example, for interacting with anti-piracy system 216, including assessing leakage determinations and reports, as well as designating a given SN as invalid in response to a report generated by anti-piracy system 216. In a more general sense, any number of user interface techniques can be used, as will be appreciated.

Display device 226 can be any suitable display, such as a standard display or a touch screen display. Input device 228 can be any suitable input devices for receiving input from a user, such as a keyboard (virtual or real), a joystick or controller, a pointing device (e.g., a mouse, trackpad), voice input (microphone and voice-to-text process). In a more general sense, server 102 may include and/or otherwise have access to any number of input/output (I/O) peripherals to support a given application and desired interface functionality (e.g., speaker, accessibility tools, etc.).

As will now be discussed, each of the modules 218, 220, 222, and 224 are used in conjunction with each other to complete a process for assessing if a given serial number has been leaked, according to an embodiment of the present disclosure. Note that other embodiments may have fewer modules or more modules. For instance, all of the functionality described could be carried out in one single module, according to some embodiments. Likewise, the function attributed to one module in one embodiment may be carried out by another module in another embodiment. For instance, the collection of activation events can be performed by module 218 in some embodiments and may be performed by module 220 in some other embodiments. Numerous such variations will be apparent. To this end, the degree of modularity or integration may vary from one embodiment to the next, and the example modules provided are not intended to limit the present disclosure to a specific structure.

According to some embodiments, event collection module 218 is programmed or otherwise configured to receive activation events for a given SN from any computing device in the world and identify characteristic parameters of the activation events. As noted above, an activation event is received each time a computing device is attempting to use the given SN to activate a software product (e.g., such as a local application or a cloud-based application). In more detail, event collection module 218 is configured to break down data received along with the activation event into different characteristic parameters that define the activation event. Examples of these characteristic parameters include any of a machine ID (sometimes referred to as a computer's physical address or MAC address) associated with an activation event, an IP address associated with an activation event, a number of machines using the IP address, a city where an activation event occurred, a country where an activation event occurred, or a domain associated with an email address linked to the activation event. Any of the characteristic parameters from the received activation events can be stored in a database (e.g., storage 204 and/or 208) for later analysis when generating input variables to use in a SN leakage determination model. In some embodiments, event collection module 218 also responds to the received activation event by either approving or rejecting the request to activate software with the SN. Further details regarding the operations of event collection module 218 are provided herein with reference to FIG. 4.

According to some embodiments, variable generation module 220 is programmed or otherwise configured to create a plurality of different input variables based on one or more of the characteristic parameters from the received activation events. The input variables are fed into a deep learning model that is trained to determine a leakage probability based on the values of the input variables. The input variables can cover various aspects of the activation events, such as geographic factors (e.g., analyzing where activation events are received from), historical factors (e.g., how certain machines have acted in the past), or software environment factors (e.g., the kind of domain being used or other program types being used by the machine). Some example input variables include any of a number of unique machines that activated the given SN, a number of unique cities where the given SN was activated, a number of unique countries where the given SN was activated, a number of unique IP addresses that activated the given SN, or a number of machines on average per each of the unique IP addresses. More details regarding how each of the various input variables is generated is provided herein with reference to FIG. 5. Flowcharts describing example methods for generating particular input variables are also provided herein at FIGS. 6 and 7.

According to some embodiments, leakage detection module 222 is programmed or otherwise configured to receive at least some of the input variables generated by variable generation module 220 and use those input variables in a predictive model to determine a leakage probability for the SN. The predictive model can be a deep learning neural network with one or more leakage determination layers that are configured during training of the neural network to determine a probability that a given SN has been leaked based on the input variables associated with the received activation events for the SN. Further details regarding how the SN leakage predictive model works are provided herein with reference to FIGS. 5 and 8.

According to some embodiments, output module 224 is programmed or otherwise configured to provide an alert that a SN has likely been leaked and/or a report containing the data used to reach the leakage determination. Output module 224 can issue the alert in one or more different ways. In some examples, output module 224 issues one or more email alerts sent to one or more personnel of the software product company that disseminated the SN or to one or more personnel who are involved with monitoring SN use. In some examples, output module 224 generates a SN leakage report that includes the determined probability that the SN has been leaked along with any of the data that was used in making the determination. This data can include any of the input variables used to determine the leakage probability and/or any other statistics involving one or more of the characteristic parameters from the received activation events. In some embodiments, the alert is sent to one or more forensic experts that make the final determination on whether SN has been leaked based on the information provided by output module 224. In some embodiments, output module 224 is configured to flag the SN as being "likely" leaked in response to determining that the SN has a leakage probability above a given alert threshold, such that any further activation requests received for the SN are automatically rejected. In some embodiments, the alert is sent to one or more marketing personnel tasked with converting instances of unlicensed use to licensed use, by providing a user associated with an invalid SN with the opportunity to purchase a valid SN.

In some embodiments, output module 224 also maintains a report for any given SN regarding leakage probability for the SN. The report includes any determined leakage probabilities for the SN along with other information associated with the prediction(s) that can be useful for analysts or other personnel when reviewing the report. In some embodiments, the report also includes the dates in which leakage predictions were made for the SN, an analyst feedback score that represents a leakage probability based on a human interpretation of the data, any comments on the analyst feedback score, and/or any comments regarding suggested modifications to make to the SN leakage model.

As will be appreciated in light of this disclosure, the various functional components/modules such as GUI 214, event collection module 218, variable generation module 220, leakage detection module 222, and output module 224 may be implemented in software, such as a set of instructions (e.g., C, C++, object-oriented C, BASIC, etc.) encoded on any machine-readable medium or computer program product, that when executed by one or more processors, cause the various methodologies provided herein to be carried out. Various components of this example embodiment can be integrated into, for example, one or more servers (any standard proprietary server computing machine). Other componentry and modules typical of a server computing system, will be apparent. In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described herein. In a more general sense, any suitable combination of hardware, software, and firmware can be used, as will be apparent in light of this disclosure.

Methodology

Figure 3:
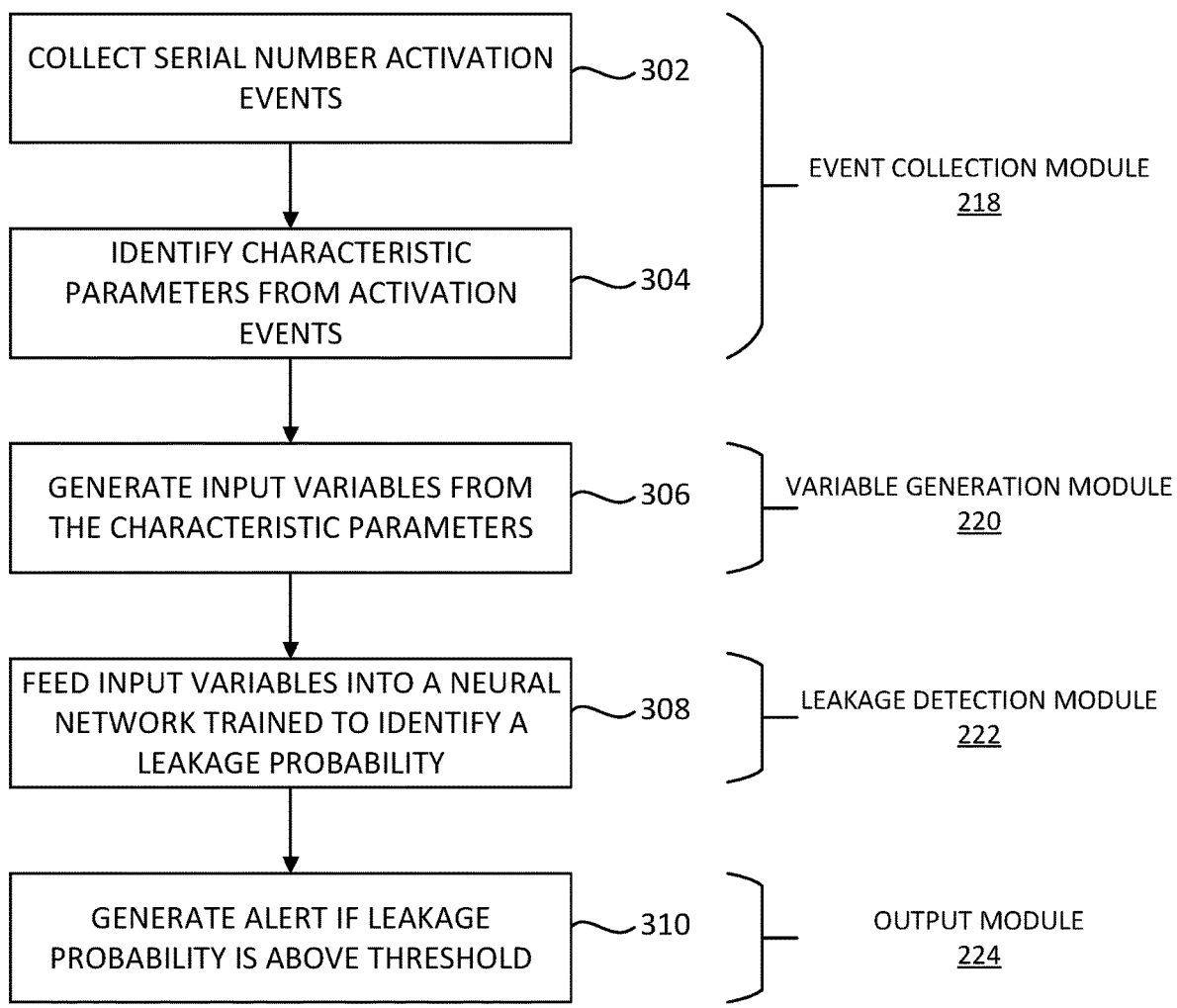
FIG. 3 is a flow diagram of an overall process for determining a leakage probability for a software serial number based on data from collected activation events associated with that serial number, in accordance with an embodiment of the present disclosure.

FIG. 3 illustrates an example method 300 of autonomously determining if a SN has been leaked, according to an embodiment. The operations, functions, or actions described in the respective blocks of example method 300 may be stored as computer-executable instructions in a non-transitory computer-readable medium, such as a memory and/or a data storage of a computing system. In some embodiments, the operations of the various blocks of method 300 are performed by various modules of anti-piracy system 216. As will be further appreciated in light of this disclosure, for this and other processes and methods disclosed herein, the functions performed in method 300 may be implemented in a differing order. Additionally, or alternatively, two or more operations may be performed at the same time or otherwise in an overlapping contemporaneous fashion.

At block 302, SN activation events are collected over a given period of time. According to some embodiments, the operations of block 302 are performed by event collection module 218. The activation events may be received from any computing device in the world. According to some embodiments, an activation event is received by a server communicatively coupled to the Internet, local area network, or wide area network any time the SN is entered by a user in an attempt to activate a software product. Accordingly, the activation event may be associated with a request being made to activate software using the SN.

At block 304, characteristic parameters are identified from each of the received activation events. According to some embodiments, the operations of block 304 are performed by event collection module 218. Examples of these characteristic parameters include any of a machine ID associated with an activation event, an IP address associated with an activation event, a number of machines using the IP address, a city where an activation event occurred, a country where an activation event occurred, or a domain associated with an email address linked to the activation event. According to some embodiments, the various characteristic parameters identified from each received activation event are stored in a database in a structured or otherwise organized fashion to associate the stored parameters with the activation events for a given SN. For instance, each SN can be associated with a data structure, and each entry of the data structure corresponds to an activation event and includes a value for each of the tracked characteristic parameters. In a more general sense, the various characteristic parameters identified from each received activation event can be stored in a database using any structure that allows for rapid parsing of the characteristic parameters when generating the input variables, as further explained below with respect to block 306, according to some such embodiments.

At block 306, input variables are generated based on one or more of the characteristic parameters. According to some embodiments, the operations of block 306 are performed by variable generation module 220. In some embodiments, the input variables are generated based on the characteristic parameters from activation events received over a given period of time. For example, in some embodiments, input variables are generated from activation events that are collected over a day, two days, half a week, a full week, or some other static collection period. The longer the time period, the more data being collected which may provide a more robust leakage determination for the SN. In other example embodiments, an activation count threshold can be set for a given SN, and a notification can be sent when the number of activations received for that SN exceeds the threshold. Thus, both static and dynamic approaches can be used with respect to when the input variables are generated based on the one or more characteristic parameters.

According to some embodiments, the input variables cover various aspects of the activation events, such as geographic factors (e.g., analyzing where activation events are received from), historical factors (e.g., how certain machines have acted in the past), or software environment factors (e.g., the kind of domain being used or other program types being used by the machine), to name a few examples. Some example input variables include any of a number of unique machines that activated the given SN, a number of unique cities where the given SN was activated, a number of unique countries where the given SN was activated, a number of unique IP addresses that activated the given SN, or a number of machines on average per each of the unique IP addresses. Other examples of input variables include a number of unlikely country pairs (e.g., activations occurring from two different countries that are suspicious), a number of machines (e.g., based on machine ID) that are known to be bad actors based on previous history with those machines, and a number of activations associated with free domain names vs enterprise domain names. Still other input variables may be contemplated based on analysis of any of the characteristic parameters. According to some embodiments, the generated input variables are stored in a database in a structured or otherwise organized fashion to associate the stored input variables with the received activation events for the given SN. For instance, each SN can be associated with a data structure, and each entry of the data structure corresponds to a number that quantifies a tracked characteristic parameter over the collection period. In a more general sense, the input variables generated from the tracked characteristic parameters can be stored in a database using any structure that allows for inputting the input variables to a neural network, as further explained below with respect to block 308, according to some such embodiments of the present disclosure.

At block 308, the input variables are fed into a neural network trained to determine a leakage probability for the SN. According to some embodiments, the operations of block 308 are performed by leakage detection module 222. The neural network may be a deep neural network (DNN) having multiple layers of interconnected neurons or nodes, where the number of neurons in each layer and the mathematical functions and/or weights applied to data received at each of the neurons is established during supervised training of the DNN. In some embodiments, the DNN is trained using a training set that includes the input variables for a first set of SNs that are known to have been leaked, and are labeled as leaked, and the input variables for a second set of random SNs that can include any number of either leaked or non-leaked SNs. In some such example embodiments, each of the first and second sets of SNs include between 500 and 1000 different SNs. The leakage probability generated as an output by the DNN may be a number between 0 and 1.

At block 310, an alert is generated if the leakage probability is above a given alert threshold. According to some embodiments, the operations of block 310 are performed by output module 224. In some examples, the alert threshold is 0.5, such that a leakage probability above 0.5 will cause the alert to be generated. In some examples, one or more email alerts are sent to one or more personnel of the company that disseminated the SN or to one or more personnel who are involved with monitoring SN use. In some examples, the alert includes a report having at least the determined probability that the SN has been leaked along with any of the data that was used in making the determination. This data can include any of the input variables used to determine the leakage probability and/or any other statistics involving one or more of the characteristic parameters from the received activation events. In some embodiments, the alert is sent to one or more forensic experts that make the final determination on whether SN has been leaked based on any of the information provided along with the alert. In some embodiments, an alert may be generated if the determined leakage probability is some difference threshold higher than a previously determined (e.g., for an earlier time period) leakage probability for the same SN. In some embodiments, the alert is sent to one or more marketing personnel tasked with converting instances of unlicensed use to licensed use, by providing a user associated with an invalid SN with the opportunity to purchase a valid SN.

Figure 4:
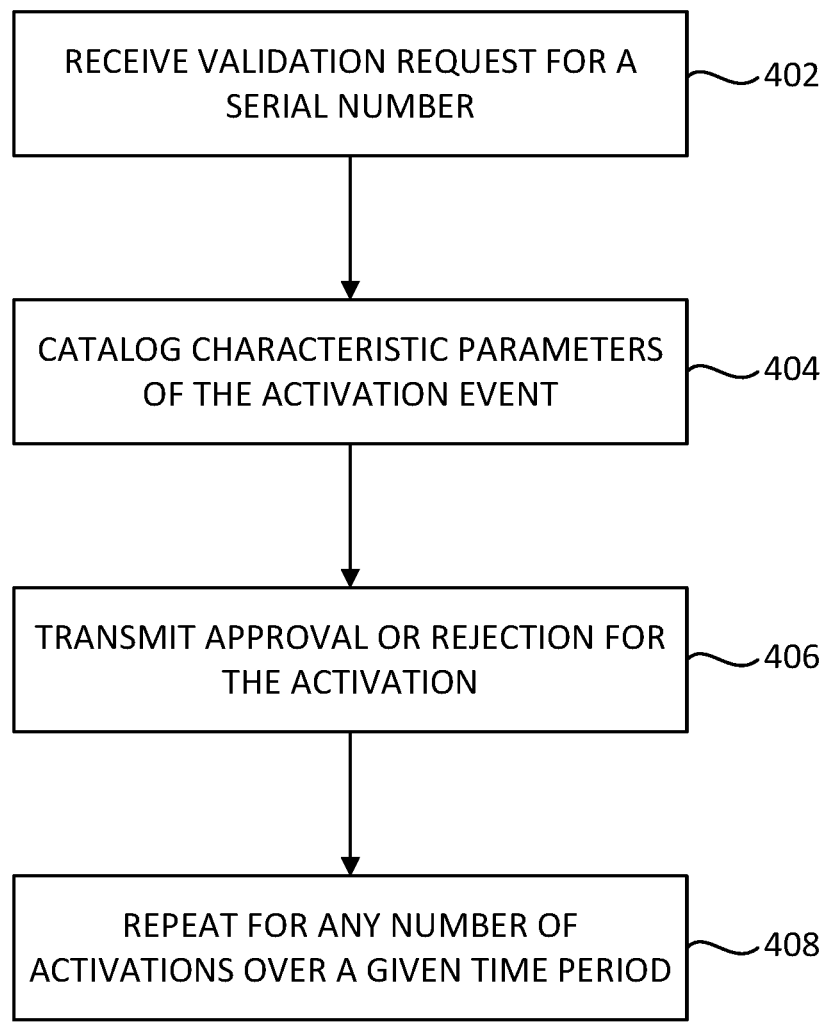
FIG. 4 is a flow diagram of a sub-process of the process of FIG. 3, for receiving activation events for a given software serial number over a period of time, in accordance with an embodiment of the present disclosure.

FIG. 4 illustrates an example method 400 of receiving activation events and transmitting approval or rejection for the activation requests, according to an embodiment. The operations, functions, or actions described in the respective blocks of example method 400 may be stored as computer-executable instructions in a non-transitory computer-readable medium, such as a memory and/or a data storage of a computing system. In some embodiments, the operations of the various blocks of method 400 are performed by event collection module 218. According to some embodiments, method 400 occurs in parallel with method 300 and is not making any predictions regarding SN leakage. Rather, method 400 describes a process in which a SN validation request is granted or denied based on whether the SN has been previously flagged as leaked. As will be further appreciated in light of this disclosure, for this and other processes and methods disclosed herein, the functions performed in method 400 may be implemented in a differing order. Additionally, or alternatively, two or more operations may be performed at the same time or otherwise in an overlapping contemporaneous fashion.

At block 402, a request is received to validate a SN entered by a user in order to activate a particular piece of software, according to an embodiment. The received request represents an activation event for the SN. The request may be received by any type of server or other networked computing device from across the Internet, a local area network, or a wide area network. As noted above, the request is also associated with data (e.g., characteristic parameters) regarding the computing device that issues the request.

At block 404, the characteristic parameters of the activation event are cataloged for future analysis, according to an embodiment. The characteristic parameters may be stored in a database to track all of the characteristic parameters from each activation event associated with the SN, as previously explained.

At block 406, a signal is transmitted by the server or other networked computing device back to the computing device that is requesting validation with the SN to either approve or deny the SN validation, according to an embodiment. The validation process may involve comparing the SN with a list of known approved SNs for the given piece of software that is to be activated. According to some embodiments, if a SN has been determined to be leaked, then it is removed from the list of known approved SNs. If the SN is found on the list, then a signal is transmitted that approves the request and allows for activation of the piece of software on the computing device making the request. However, if the SN is not found on the list, then a signal is transmitted that denies the request and the associated piece of software cannot be activated on the computing device making the request. According to some embodiments, SNs that have been determined to be leaked are added to a list of known leaked SNs. Thus, the validation process may involve comparing the SN with the list of known leaked SNs and, if the SN is found on the list, then a signal is transmitted that denies the request and the associated piece of software cannot be activated on the computing device making the request. Eventually, when a sufficient amount of characteristic parameters are catalogued for a given SN, that SN can be evaluated for leakage, prior to any further approvals of validation requests using that SN, as will be appreciated in light of this disclosure.

At block 408, each of the operations from blocks 402-406 are repeated for another received request to validate the SN. According to some embodiments, these activation events continue to be received over a given time period before analyzing the characteristic parameter data from all of the received activation events to generate input variables used to determine if the SN has been leaked. Other embodiments may use a more dynamic approach, where an activation count threshold for a given SN is used to determine when analysis of the characteristic parameter data should commence. It should be understood that method 400 can occur simultaneously for any number of different SNs.

Figure 5:
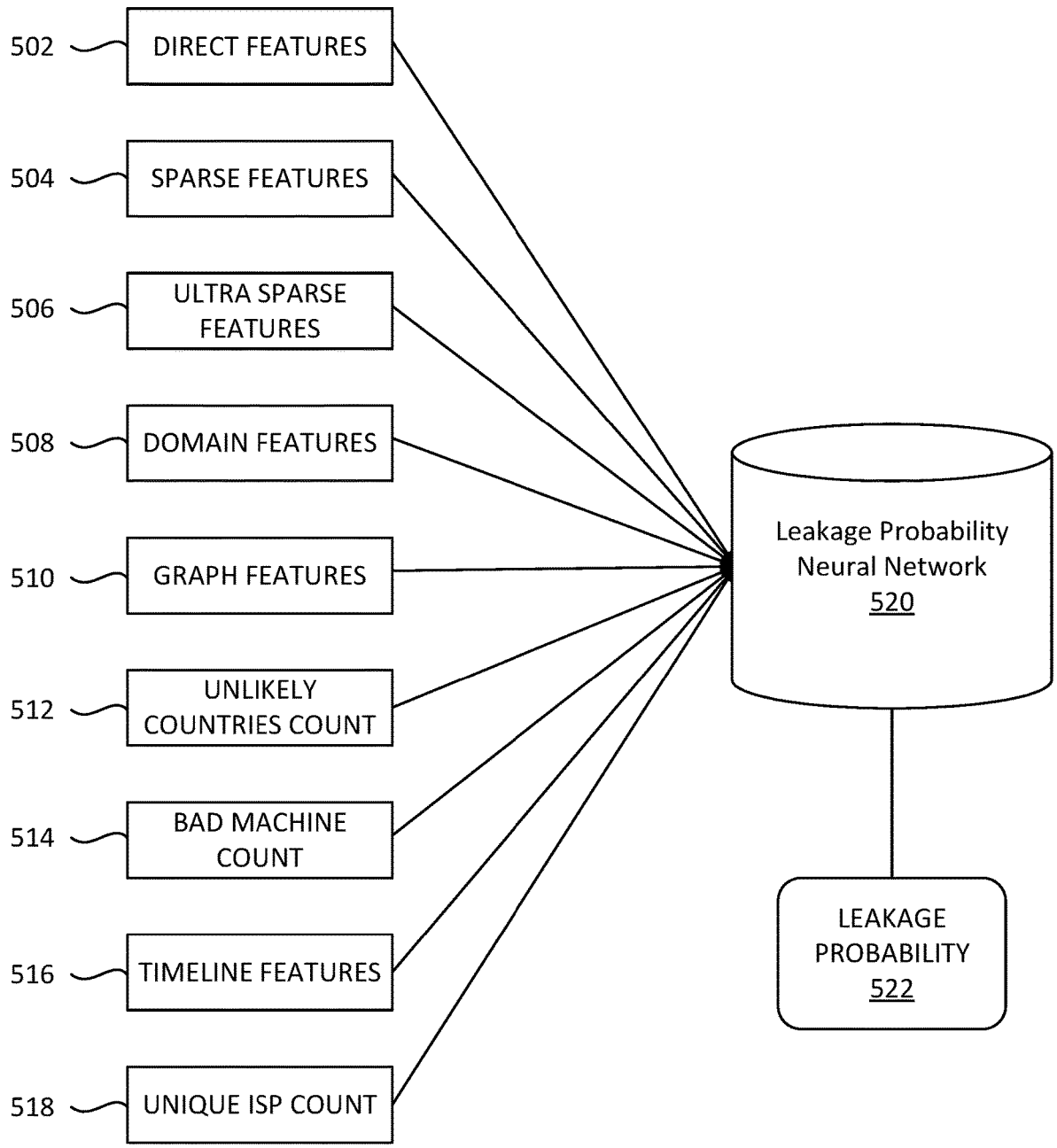
FIG. 5 shows a diagram of example input variable categories that are fed into a neural network to determine a leakage probability of a software serial number, in accordance with an embodiment of the present disclosure.

FIG. 5 illustrates a schematic of example categories of input variables associated with a SN being received by a neural network 520 to determine a leakage probability for the SN, according to an embodiment. It should be understood that the different input categories 502-518 represent example categories that can be used to determine the leakage probability. Any number of different input variables from across any number of different input categories can be used as inputs to neural network 520. As noted above, each of the input variables from any of the example input categories can be generated based on one or more of the characteristic parameters from the activation events collected over a given period of time or until an activation count threshold is met. The example input categories shown in FIG. 5 include direct features 502, sparse features 504, ultra sparse features 506, domain features 508, graph features 510, unlikely countries count 512, bad machine count 514, timeline features 516, and unique ISP count 518. Further details of generating input variables from each of these categories is provided herein.

According to some embodiments, direct features 502 includes one or more input variables that represent counts of unique machines or geographic locations that are associated with the activation events. Some example input variables that are members of direct features category 502 include unique_msns, unique_city, unique_countries, unique_ips, and u_msn_per_u_ip. According to some embodiments, the unique_msns input variable is a count of the number of different machines (e.g., based on machine ID) that attempt to activate the SN. According to some embodiments, the unique_city input variable is a count of the number of different cities that attempt to activate the SN. According to some embodiments, the unique_countries input variable is a count of the number of different countries that attempt to activate the SN. According to some embodiments, the unique_ips input variable is a count of the number of different IP addresses that attempt to activate the SN. According to some embodiments, the u_msn_per_u_ip input variable is a count of the number of different machines (e.g., determined based on machine ID) on average that use each of the different IP addresses. In other words, activation events that have the same IP address, but different machine IDs, represent different computing devices that are linked as part of a broader entity (e.g., different computers at a business that share a same business IP address).

According to some embodiments, sparse features 504 includes input variables that are similar to those from direct features 502, but on a smaller subset of activation events. The smaller subset of activation events may be defined by weeding out those activation events that are highly likely to be legitimate (thus leaving behind the activation events that have a higher chance of being illegitimate). Thus, according to some embodiments, generating sparse features first involves generating a subset of the activation events from which to determine the various sparse features. Examples of sparse input variables from the sparse features category 504 include sparse_unique_msns, sparse_unique_city, sparse_unique_countries, sparse_unique_ips, and sparse_u_msn_per_u_ip. According to some embodiments, ultra sparse features 506 includes input variables like those from direct features 502, but determined from an even smaller subset of activation events compared to sparse features 504. Examples of ultra sparse input variables from the ultra sparse features category 506 include ul_sparse_unique_msns, ul_sparse_unique_city, ul_sparse_unique_countries, ul_sparse_unique_ips, and ul_sparse_u_msn_per_u_ip.

Figure 6:
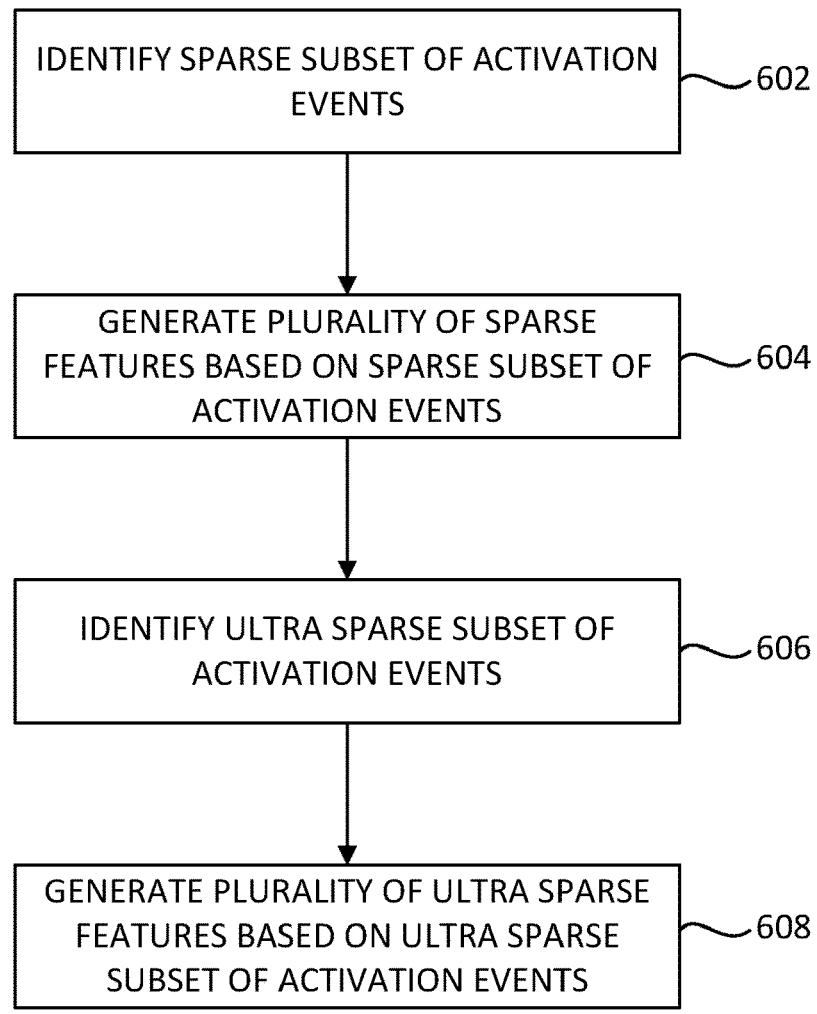
FIG. 6 is a flow diagram of a sub-process of the process of FIG. 3, for determining sparse and ultra-sparse input variables for a given serial number, in accordance with an embodiment of the present disclosure.

FIG. 6 illustrates a method 600 for generating both sparse and ultra sparse input variables, according to an embodiment. The operations, functions, or actions described in the respective blocks of example method 600 may be stored as computer-executable instructions in a non-transitory computer-readable medium, such as a memory and/or a data storage of a computing system. In some embodiments, the operations of the various blocks of method 600 are performed by variable generation module 220. As will be further appreciated in light of this disclosure, for this and other processes and methods disclosed herein, the functions performed in method 600 may be implemented in a differing order. Additionally, or alternatively, two or more operations may be performed at the same time or otherwise in an overlapping contemporaneous fashion.

At block 602, a sparse subset of the collected activation events is identified. According to some embodiments, the sparse subset is determined by identifying any activation events associated with popular cities or domain names (e.g., by using a top threshold occurrence among all activation events) and removing those activation events from consideration, such that the only activation events left in the subset are those associated with cities or domain names of low occurrence among all the activation events. For example, consider a situation where 100 activation events are collected for a SN with the city parameter looking like: San Francisco—56, New York—20, Beijing—3, Toronto 14, and Bangalore—7. Only activation events occurring in a city fewer times than the threshold occurrence are included in the sparse subset. If, for example, the threshold occurrence is 5%, then only the activation events from Beijing are included in the sparse subset as only Beijing has fewer than 5 activations (e.g., 5 being 5% of the total 100 activations). Any threshold occurrence value can be used depending on how inclusive the sparse subset is desired to be.

At block 604, the plurality of sparse features noted above are generated based on the sparse subset of activation events. Based on the example above, only the characteristic parameters from the 3 activation events from Beijing would be considered when determining the sparse input variables. According to some embodiments, the sparse input variables sparse_unique_msns, sparse_unique_city, sparse_unique_countries, sparse_unique_ips, and sparse_u_msn_per_u_ip are generated in the same way as their non-sparse counterparts discussed above for direct features 502, but with only performing the counts from within the sparse subset of activation events as opposed to all of the activation events. According to some embodiments, if sparse_unique_ips=0 (which can occur if there are no activation events in the sparse subset), then sparse_u_msn_per_u_ip is set to the same value as u_msn_per_u_ip.

At block 606, an ultra sparse subset of the collected activation events is identified. According to some embodiments, the ultra sparse subset is determined in the same way as the sparse subset discussed above in block 602, but with using a lower threshold occurrence value. For example, if the threshold occurrence value for determining the sparse subset of collected activation events is 5%, then the threshold occurrence value for determining the ultra sparse subset of collected activation events can be any percentage less than 5% like, for example, 1%. Any threshold occurrence value can be used depending on how inclusive the ultra sparse subset is desired to be.

At block 608, the plurality of ultra sparse features noted above are generated based on the ultra sparse subset of activation events. According to some embodiments, the ultra sparse input variables ul_sparse_unique_msns, ul_sparse_unique_city, ul_sparse_unique_countries, ul_sparse_unique_ips, and ul_sparse_u_msn_per_u_ip are generated in the same way as their non-sparse counterparts discussed above for direct features 502, but with only performing the counts from within the ultra sparse subset of activation events as opposed to all of the activation events. According to some embodiments, if ul_sparse_unique_ips=0 (which can occur if there are no activation events in the ultra sparse subset), then ul_sparse_u_msn_per_u_ip is set to the same value as sparse_u_msn_per_u_ip.

According to some embodiments, any number of sparse input variables could be generated by using different threshold occurrence values to create different subsets of the activation events. In some embodiments, only one set of sparse input variables are created (e.g., using one threshold occurrence value) and no ultra sparse input variables are used.

Returning to FIG. 5, domain features 508 includes one or more input variables that represent the type of domain associated with any email addresses linked with any of the activation events, according to some embodiments. Not all activation events are associated with an email address, but some SN activations require an email address to be linked with the activation. Any email domain names are identified from the collected activation events and then input variables are generated based on how many of the domain names are free domains and how many of the domain names are enterprise domains. Example free domains include web-based email providers that any user can access, such as Gmail, Hotmail, or Yahoo Mail, or email software available to any customer such as Microsoft Outlook. Example enterprise domains include corporate email addresses that are only available to employees of a particular company or corporate entity. In some embodiments, an input variable free_domain_cnt represents a count of activation events associated with a free domain and an input variable enterprise_domain_cnt represents a count of activation events associated with an enterprise domain.

According to some embodiments, the domain name associated with a given activation event can be compared against a list of known free domains to determine if the domain should be counted as a free domain. In some embodiments, certain features of the domain name can designate the domain as being an enterprise domain, such as using .edu or .gov as part of the address. According to some embodiments, a higher number of free domains being used for a given SN may yield a higher probability that the SN has been leaked.

According to some embodiments, graph features 510 includes one or more input variables that represent other features about the computing devices that are attempting to activate the SN. These features relate to how the machines have used other SNs to determine whether their activity appears suspect. For example, an input variable sister_serials can be used to represent a count of the total number of all SNs used by the computing devices that issued the collected activation events. According to some embodiments, based on the machine ID from a given activation event, a database of prior SN activations can be accessed to determine how many other SNs are being used by that machine. For a given collection of activation events, a high sister_serials value makes it more probable that the SN has been leaked, since one or more of the machines requesting activation of the SN appear suspect due to the usage of so many SNs.

In another example, graph features 510 includes an input variable invalid_serial_failed_activation_attempt to represent a total number of rejected SN activation attempts made by the computing devices that issued the collected activation events. According to some embodiments, machine IDs from the activation events are used to determine how many times each particular machine ID was found to have requested activation of an invalid SN during the time period that the activation events are being collected. For example, if activation events are collected over a time period of 3 days from 100 different machine IDs, then invalid_serial_failed_activation_attempt is increased each time any of the 100 different machines attempts to activate an invalid SN over the 3 day time period.

In another example, graph features 510 includes an input variable cross_program_type_cnt to represent how many machines (e.g., based on machine ID) from the activation events use SNs that belong to different program types. Examples of program types include educational programs, government programs, commercial programs, or corporate programs. For example, if activation events are collected for a given SN associated with an education program, then cross_program_type_cnt is increased each time a machine ID from one of the activation events is found to also have activated a SN associated with one of the other program types (e.g., government, commercial, or corporate). In some embodiments, a database that stores all received SN requests is accessed to determine what other SNs have been activated for any given machine ID. According to some embodiments, a high cross_program_type_cnt increases the probability the SN has been leaked as it is unlikely for a given machine to need SNs for different program types.

According to some embodiments, unlikely countries count 512 includes an input variable unlikely_countries that represents a count of how many different countries from the received activation events are considered to be unlikely to have legitimately obtained the SN. Determining which countries are considered to be unlikely involves determining country affinity scores between different pairs of countries, and using those affinity scores below a given threshold to identify unlikely countries.

Figure 7:
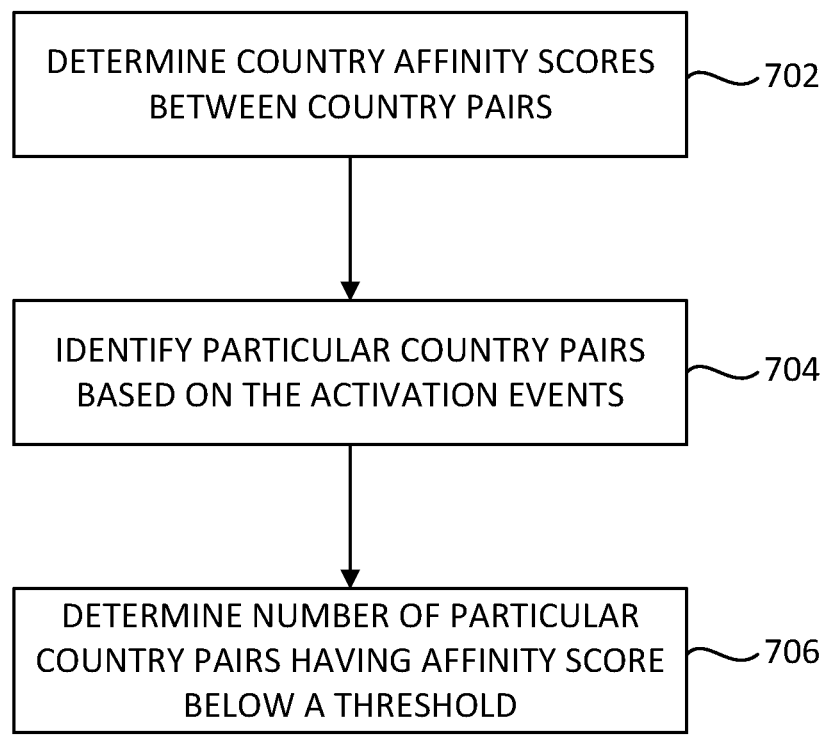
FIG. 7 is a flow diagram of a sub-process of the process of FIG. 3, for determining a list of unlikely countries where a serial number was activated, in accordance with an embodiment of the present disclosure.

FIG. 7 illustrates a method 700 for generating country affinity scores and using the scores to determine a value for the input variable unlikely_countries, according to an embodiment. The operations, functions, or actions described in the respective blocks of example method 700 may be stored as computer-executable instructions in a non-transitory computer-readable medium, such as a memory and/or a data storage of a computing system. In some embodiments, the operations of the various blocks of method 700 are performed by variable generation module 220. As will be further appreciated in light of this disclosure, for this and other processes and methods disclosed herein, the functions performed in method 700 may be implemented in a differing order. Additionally, or alternatively, two or more operations may be performed at the same time or otherwise in an overlapping contemporaneous fashion.

At block 702, country affinity scores are determined between different pairs of countries. Specifically, a country affinity score between a first country (c1) and a second country (c2) represents a likelihood that a SN activated most often in c1 is also activated in c2. Accordingly, the country affinity score between c1 and c2 is not the same as the country affinity score between c2 and c1. The country affinity score may be calculated as follows:

$$\text{country\_affinity}(c1, c2) = \text{num\_serials\_activated\_in\_}c1\_\&\_c2 / \text{num\_serials\_activated\_in\_}c1$$

where num_serials_activated_in_c1_&_c2 is the number of SNs activated in both c1 and c2, and num_serials_activated_in_c1 is the total number of SNs activated in c1. According to some embodiments, country affinity scores are determined between each possible country pair around the world, with the calculated affinity scores stored in a database. In some other embodiments, country affinity scores are determined for pairs of only those countries associated with a given collection of activation events (such as activation events collected over a given time period for a SN). The count of SNs activated from different countries may be determined using a database that stores SN activation event data. For example, received activation events for any SN can be filtered to identify only those received from a given country, or only those that are received from a given pair of countries.

At block 704, country pairs are identified based on the collected activation events. According to some embodiments, a country with the highest number of total activations is selected to pair with each other country and the affinity scores between those different country pairs are identified (if pre-determined) or determined. For example, a collection of activation events yields the following country data: USA—712, Brazil—212, Sudan—2, India—56, Great Britain—108. Since USA has the highest number of activations, country affinity scores between USA and the other countries are identified or determined. Table 1 below provides example affinity scores that may be determined in this way.

TABLE 1

| Country 1 | Country 2 | Affinity |
|---|---|---|
| USA | Sudan | 0.00140285172 |
| USA | Great Britain | 0.06512384501 |
| USA | Brazil | 0.18347484196 |
| USA | India | 0.1427393003 |

As can be observed from Table 1, the lowest affinity score is seen between the USA and Sudan, which makes intuitive sense. Higher affinity scores, such as between the USA and Brazil, may be due to many US companies having workstations and server farms in Brazil.

At block 706, a number of country pairs having an affinity score below a threshold are counted to determine the value for input variable unlikely_countries, according to some embodiments. In the example provided above, for a given threshold value of 0.02, only one country pair has an affinity score below the threshold (USA and Sudan), so unlikely_countries would have a value of 1. The threshold may be predetermined based on how sensitive the analysis is desired to be with regards to unlikely countries that request activation of the SN.

Returning to FIG. 5, bad machine count 514 includes an input variable bad_msn_cnt that represents a count of known machines (e.g., based on machine ID) to be suspect from the received collection of activation events. According to some embodiments, a list of bad machine IDs is stored and is compared against the machine IDs from the collected activation events to determine if any of the machines are on the list. The input variable bad_msn_cnt may be increased each time one of the machine IDs from the collected activation events is found on the list. According to some embodiments, a machine ID is placed on the bad machine list if it known to have used multiple leaked SNs in the past.

According to some embodiments, timeline features 516 includes one or more input variables that represent how certain features of the certain activation events change over time. For example, input variables can be generated that generally track when during a given period of time certain variables showed increases, such as the number of different countries or different cities where activation events are received from.

In one example, timeline features 516 includes an input variable country_cnt_ratio that represents a ratio of different countries added near the end of the activation event collection period compared to how many different countries were added at the beginning of the activation event collection period. For example, country_cnt_ratio can be the ratio between the number of new countries observed from activation events collected in the final 20% of activations over the number of new countries observed from activation events collected in the first 20% of activations. In a specific example, if 500 activation events are collected over a period of time, then the number of new countries added in the last 100 activations is divided by the number of new countries added in the first 100 activations to provide the country_cnt_ratio. A similar analysis can be performed with cities to determine an input variable city_cnt_ratio.

In another example, timeline features 516 includes an input variable country_added_ratio that represents more specifically how many new countries were added within a final percentage of received activation events. For example, country_added_ratio can be the ratio between the number of new countries observed from activation events collected in the final 20% of activations over the total count of unique countries observed across all collected activation events. A similar analysis can be performed with cities to determine an input variable city_added_ratio.

According to some embodiments, unique ISP count 518 includes one or more input variables that represent a count of how many different internet service providers (ISPs) are used to provide the collected activation events for a given SN. Accordingly, an input variable unique_isp_count may provide a count of different ISPs used, with high values of unique_isp_count likely yielding a higher probability of a leaked SN.

According to some embodiments, many ISPs can have slightly different names but still be the same ISP. For example, the ISPs "sony corporation", "sony media software and services inc.", and "sony network communications inc." are all really the same ISP with different names. To avoid double counting ISPs with similar names, the list of identified ISPs can be optimized to generate the input variable unique_isp_count_optimized. According to some embodiments, the list of identified ISPs from the collected activation events can be optimized by sorting the ISPs by their length, and then comparing the names against one another. If a text match of at least some threshold percentage (e.g., at least 50%) is found between two ISPs, then they are determined to be the same and are counted as 1 unique ISP rather than 2. According to some embodiments, the list of ISPs can be further cleaned by removing extraneous stop words like inc., limited, solutions, services, etc. The stop words may be identified by finding the most frequently used words across all known ISPs from any set of prior SN activation events.

Figure 8:
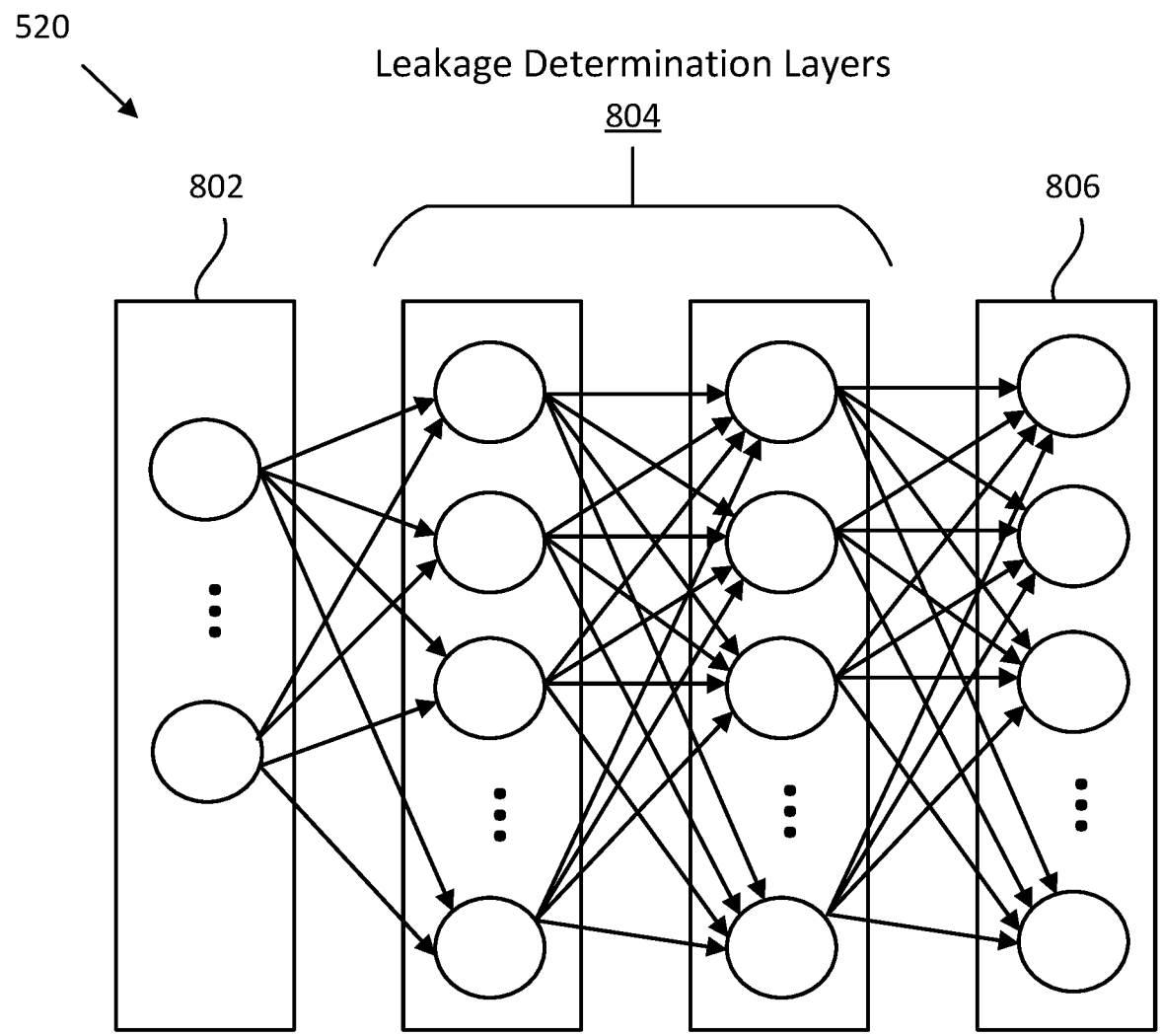
FIG. 8 shows an example of the different layers used in the neural network to determine a serial number leakage probability, in accordance with an embodiment of the present disclosure.

As noted above, any number of different input variables from across any of the different input categories 502-518 can be used as inputs to neural network 520. Neural network 520 is trained to receive the various input variables and output a leakage probability 522 (e.g., a number between 0 and 1) for the given SN. FIG. 8 illustrates an example of neural network 520 that is used to generate a leakage probability for a SN based on a collection of different input variables associated with the SN activation events. Neural network 520 includes an input layer 802, one or more leakage determination layers 804, and an output layer 806.

According to some embodiments, each of the layers of neural network 520 include neurons that represent mathematical functions and/or weights applied to data received as input to the neuron. The output of a neuron of one layer is received by each of the neurons in the proceeding layer. Accordingly, input layer 802 of neural network 520 can include any number of neurons that receive the collection of different input variables that describe features and patterns from the collected activation events, according to some embodiments.

According to some embodiments, leakage determination layers 804 are configured during training of neural network 520 to identify a leakage probability based on the received values for different input variables. The number of leakage determination layers 804, the number of neurons in each of the layers, and the function performed by each neuron are established during supervised training as neural network 520 learns how to determine the leakage probability. Accordingly, the characteristics (e.g., number of layers, number of neurons in a given layer, etc.) of leakage determination layers 804 can be different depending on various training factors. According to some embodiments, neural network 520 is trained using a training set of SNs (along with the input variables for those SNs). Of the set of SNs used for training, a first subset of SNs are known to be leaked and are labeled as such. Accordingly, neural network 520 learns how to identify what a leaked SN looks like based on the various input variables associated with the leaked SNs from the training set. Additionally, a second subset of SNs are random SNs (unlabeled) with the assumption that the majority of the random SNs will be genuine. In some embodiments, the second subset of SNs includes SNs that are known to be genuine and are labeled as such. In some embodiments, a training set of SNs used to train neural network 520 includes between 500 and 1000 leaked SNs and between 500 and 1000 random SNs.

Once training has been performed, a test set of SNs can be used to test the accuracy of neural network 520. An example test set may include a given number of known leaked SNs and another similar number of random SNs (again, with the assumption that most of them will be genuine). If neural network 520 performs well on the test set, then a final validation set of SNs can be used which includes additional verification performed by a human operator (e.g., a forensic data expert). In one example, the validation set of SNs includes a random selection of SNs fed into neural network 520. From the predictions made by neural network 520 on the validation set, a confusion matrix can be generated to provide a detailed summary of the prediction results. Table 2 provides an example confusion matrix along with values generated from a validation set having 199 randomly selected SNs, which was confirmed to include 70 leaked SNs and 129 genuine SNs.

TABLE 2

| Classes | Precision | Recall | f1-score | Support |
|---------|-----------|--------|----------|---------|
| Random | 0.88 | 0.82 | 0.85 | 129 |
| Leaked | 0.71 | 0.79 | 0.74 | 70 |
| Accuracy | | | 0.81 | 199 |
| Macro Avg | 0.79 | 0.8 | 0.8 | 199 |
| Weighted Avg | 0.82 | 0.81 | 0.81 | 199 |

Regarding the different data categories of Table 2, precision represents a percentage of SNs that actually belong to a given class (leaked or random) out of all of the SNs predicted to belong to the given class by the neural network. Recall represents a percentage of SNs the neural network correctly predicted out of all of the SNs that actually belong to a given class. The f1-score is the harmonic mean between the precision and recall scores for a given class and it can be used to represent the accuracy of the model. More particularly, the f1-score is calculated as:

$$f1-\text{score} = \frac{2*\text{precision}*\text{recall}}{\text{precision}+\text{recall}} \quad (1)$$

Support provides the total number of SNs used in each class. Macro average provides a simple average of the various data categories between both classes, while the weighted average takes into account the support (# of SNs) for each of the classes when averaging the values for each of the data categories. The overall accuracy of the model is provided as the weighted average of the f1-score. The neural network model accuracy of 0.81 for correctly determining whether a SN has been leaked was obtained by training the neural network with a training data set that included 730 leaked SNs and 724 random SNs.

Figure 9:
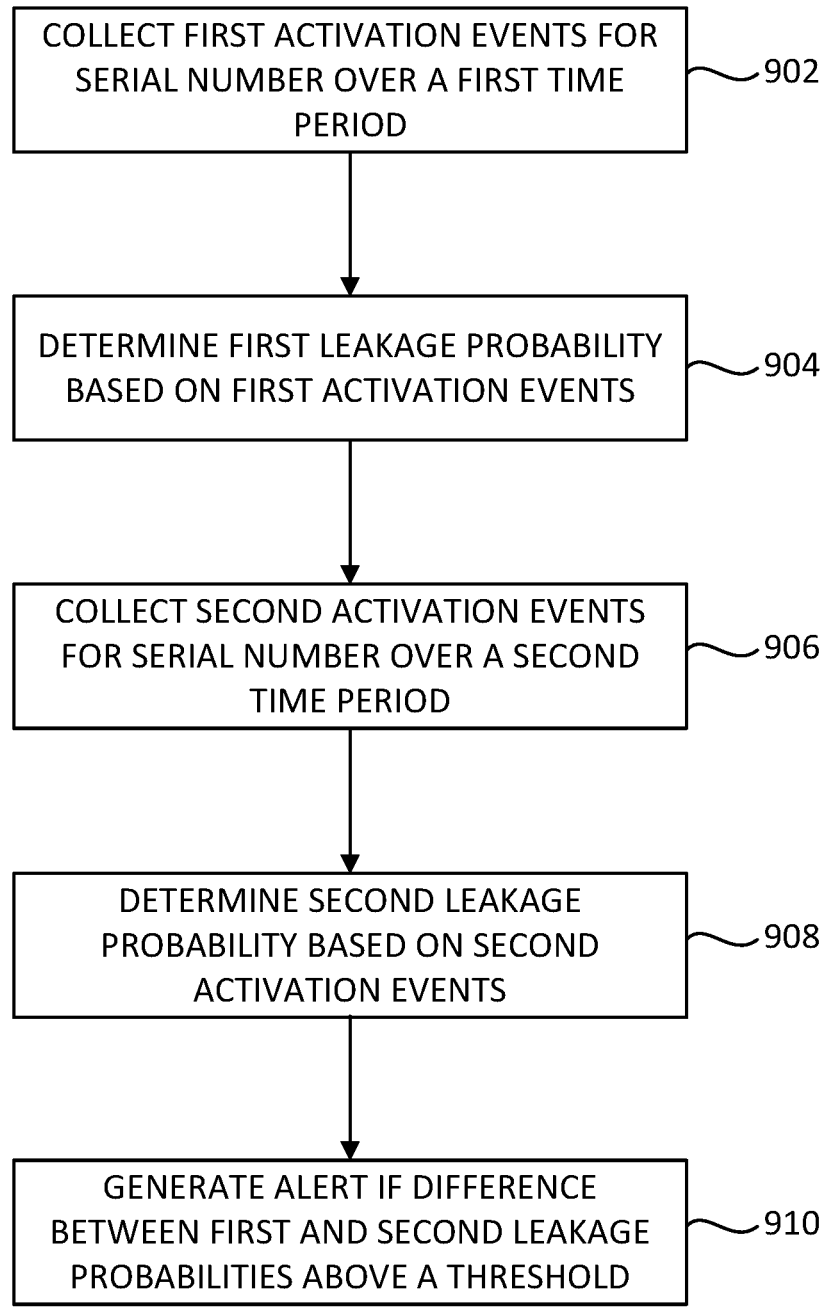
FIG. 9 is a flow diagram of a sub-process of the process of FIG. 3, for comparing leakage probabilities determined at different times and issuing an alert if the difference is greater than a threshold, in accordance with an embodiment of the present disclosure.

FIG. 9 illustrates a method 900 for detecting SN leakage based on an increase in its leaked probability over time, according to an embodiment. The operations, functions, or actions described in the respective blocks of example method 900 may be stored as computer-executable instructions in a non-transitory computer-readable medium, such as a memory and/or a data storage of a computing system. In some embodiments, the operations of the various blocks of method 900 are performed by output module 224. As will be further appreciated in light of this disclosure, for this and other processes and methods disclosed herein, the functions performed in method 900 may be implemented in a differing order. Additionally, or alternatively, two or more operations may be performed at the same time or otherwise in an overlapping contemporaneous fashion.

At block 902, a first set of activation events for a given SN are collected over a first time period. As noted above, the activation events for the given SN are collected from computing devices around the world over time. The data (e.g., characteristic parameters) collected from each of the activation events is stored in a database and used to determine a set of input variables to feed to a leakage detection model (e.g., a trained neural network), according to some embodiments. The database may hold data collected from activation events for the given SN received from any point in the past (e.g., the first time period covers all time in the past). In some embodiments, due to memory limitations, the database may only hold data collected from activation events received over some specific time period, such as one year (e.g., the first time period is one year).

At block 904, a first leakage probability is determined based on the activation events collected over the first time period. As noted above, input variables are determined based on the data from the first set of activation events and fed into a trained neural network that outputs the first leakage probability for the SN, according to some embodiments. In this example, the first leakage probability is not above the alert threshold needed to generate an alert indicating that the SN has been leaked (e.g., given an alert threshold value of 0.5, the first leakage probability is below 0.5).

At block 906, a second set of activation events for the given SN are collected over a second time period after the first time period. According to some embodiments, the second time period does not overlap with any part of the first time period. The second time period may occur directly after the first time period. The second time period may be the period of time between when leakage determinations are made by the server. For example, if the server performs a leakage determination twice a week, then the second time period would be half of a week (e.g., about 3.5 days).

At block 908, a second leakage probability is determined based on the activation events collected over both the first time period and the second time period. As noted above, input variables are determined based on the data from the first and second set of activation events and fed into a trained neural network that outputs the second leakage probability for the SN, according to some embodiments. In this example, the second leakage probability is not above the alert threshold needed to generate an alert indicating that the SN has been leaked (e.g., given an alert threshold value of 0.5, the second leakage probability is below 0.5).

At block 910, an alert is generated if the difference between the first and second leakage probabilities is above a difference threshold. In other words, an alert can also be generated if the leakage probability raises too sharply (e.g., is above the difference threshold), which indicates that the SN has likely been leaked even if neither of the leakage probabilities alone raises above the alert threshold (e.g., 0.5). In some embodiments, the difference threshold can be any value that is less than the alert threshold (e.g., less than 0.5). In one example, given a difference threshold of 0.25, an alert would be generated for a first leakage probability of 0.05 and a second leakage probability of 0.33.

Data Comparison Between Leaked and Random Classes of SNs

FIGS. 10A-10K provide box plots that compare the values of different input variables between a set of known leaked SNs and a set of random SNs, according to some embodiments. As noted above, the leaked SNs have been confirmed as leaked while the random SNs are selected from potentially millions of known volume SNs with the assumption being that most of them will be genuine (e.g., non-leaked). For each of the plots, there are 730 leaked SNs and 724 random SNs.

Figure 10A:
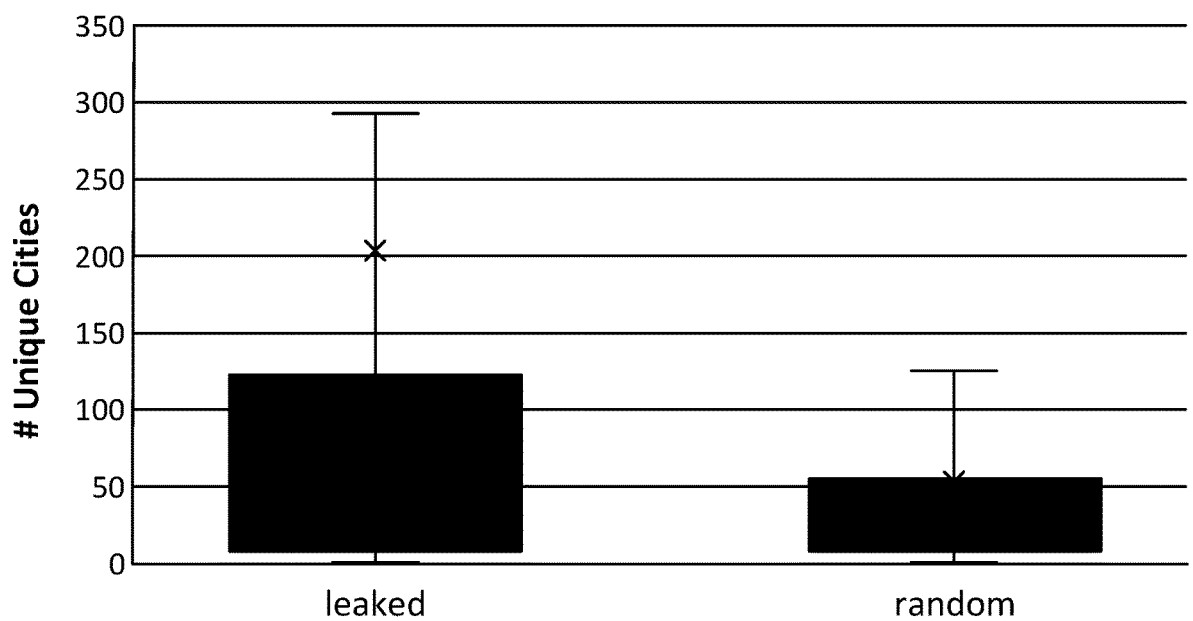
FIGS. 10A-10K show box plots that compare the values of different input variables observed between a group of leaked serial numbers and a group of random serial numbers, in accordance with some embodiments of the present disclosure.

FIG. 10A provides a comparison of the unique_city input variable between leaked and random SNs. In general, leaked SNs exhibit a higher number of different cities that request activation.

Figure 10B:
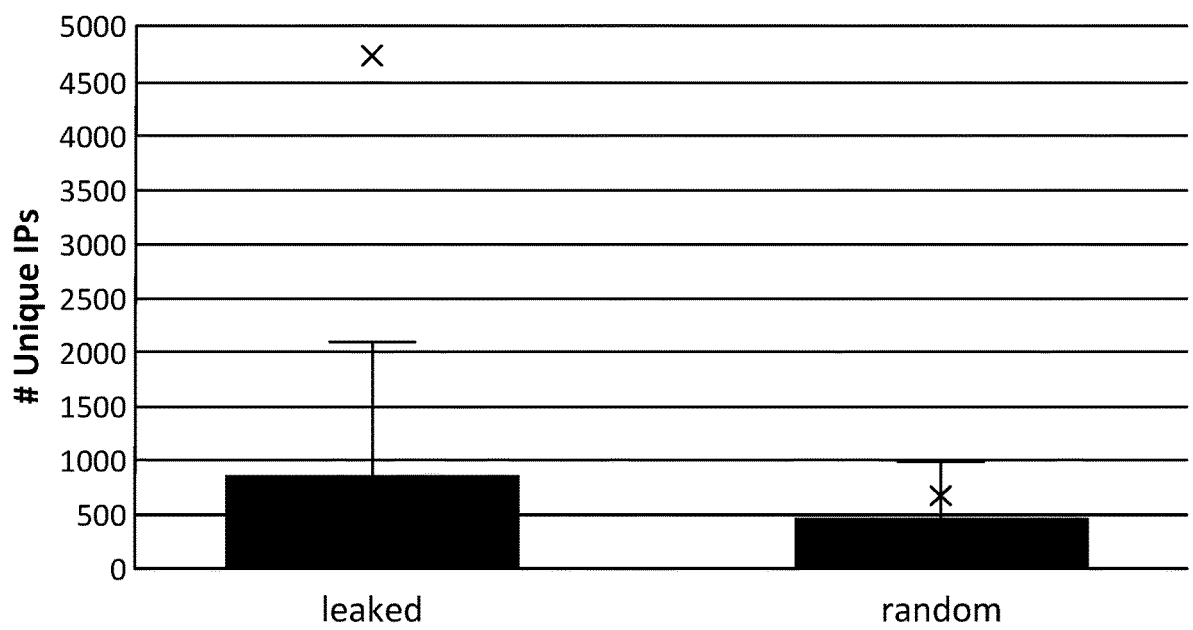

FIG. 10B provides a comparison of the unique_ips input variable between leaked and random SNs. In general, leaked SNs exhibit a higher number of different IP addresses that request activation.

Figure 10C:
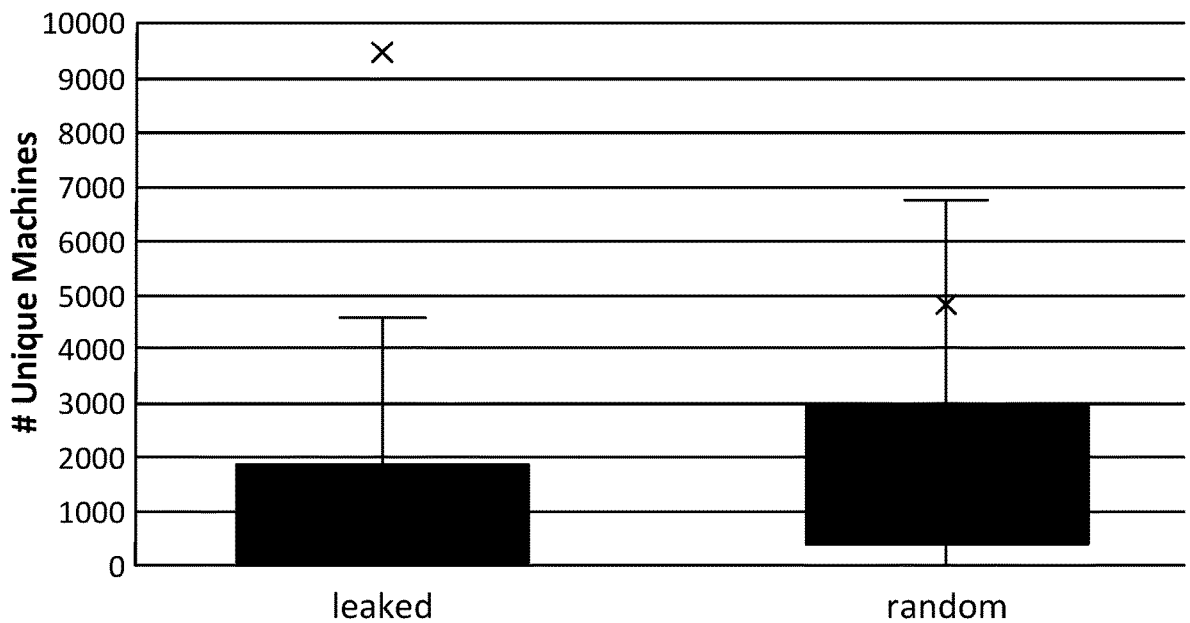

FIG. 10C provides a comparison of the unique_msns input variable between leaked and random SNs. Interestingly, random SNs generally exhibit a higher number of different machine IDs that request activation. This may be due to multiple different machines using legitimate enterprise licenses at locations like universities or businesses.

Figure 10D:
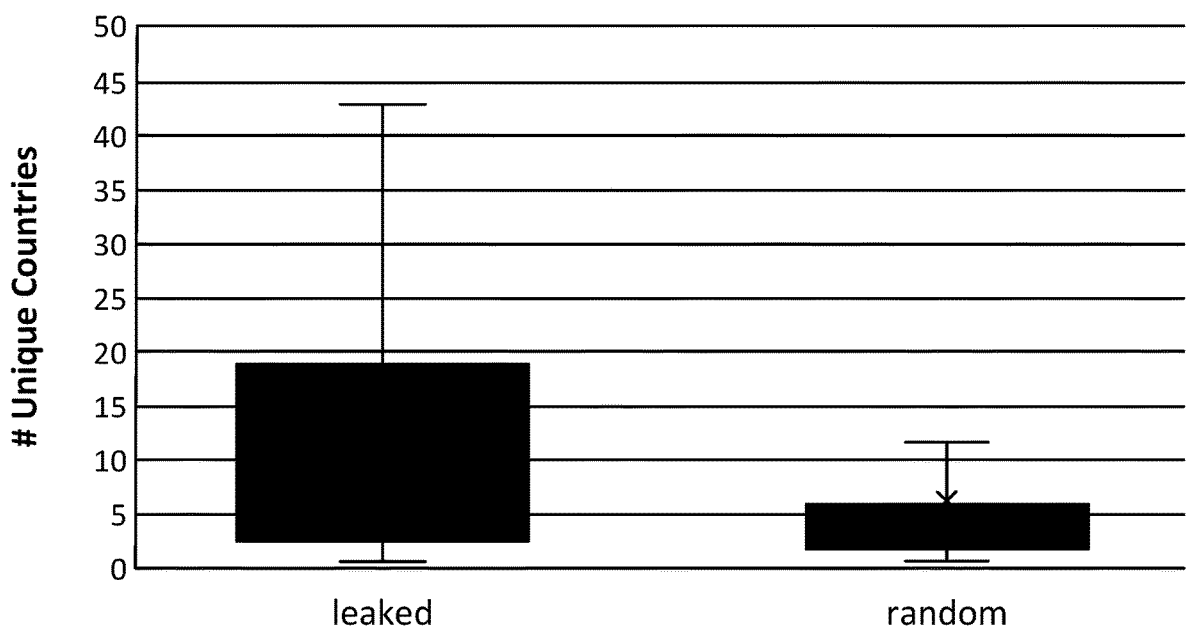

FIG. 10D provides a comparison of the unique_countries input variable between leaked and random SNs. In general, leaked SNs exhibit a higher number of different countries that request activation.

Figure 10E:
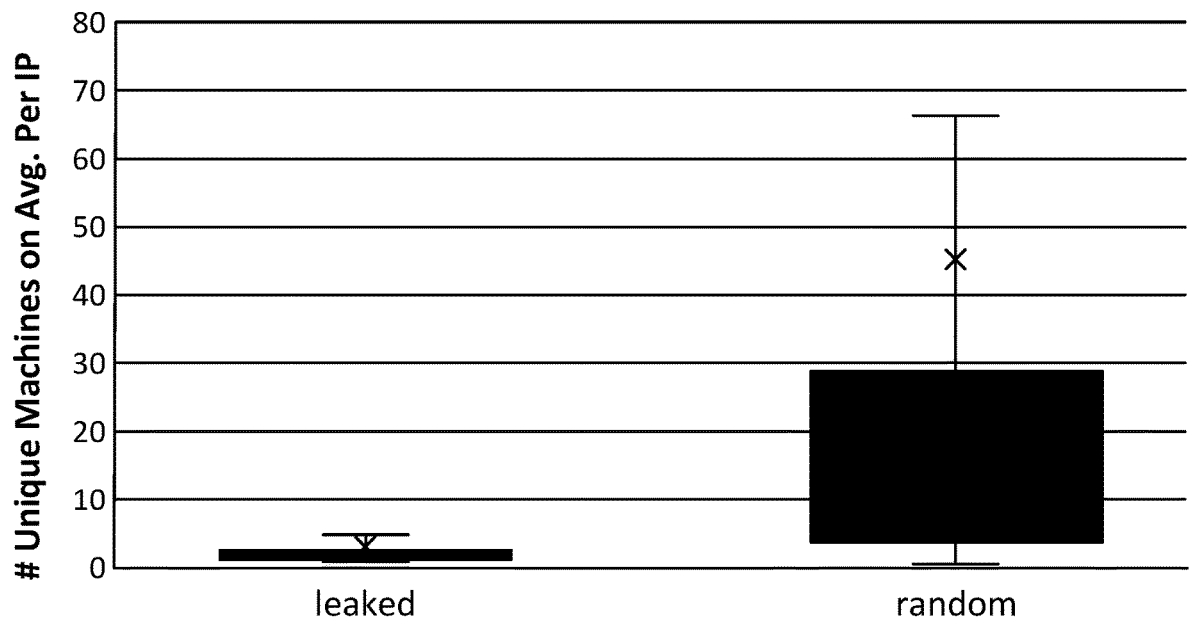

FIG. 10E provides a comparison of the u_msn_per_u_ip input variable between leaked and random SNs. In general, random SNs exhibit a higher number of average machines per IP address requesting activation. This may be due to the larger number of legitimate enterprise licenses being used. Additionally, bad actors that have stolen a SN are typically using it only for personal use.

Figure 10F:
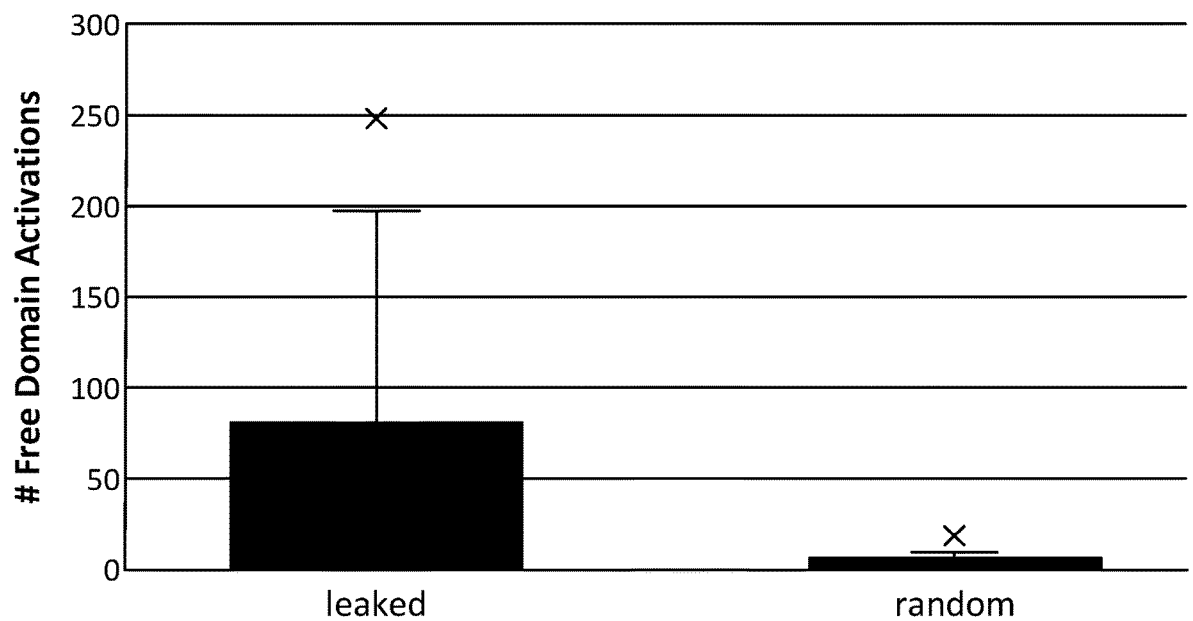

FIG. 10F provides a comparison of the free_domain_cnt input variable between leaked and random SNs. In general, leaked SNs exhibit a higher number of free domain email addresses that request activation.

Figure 10G:
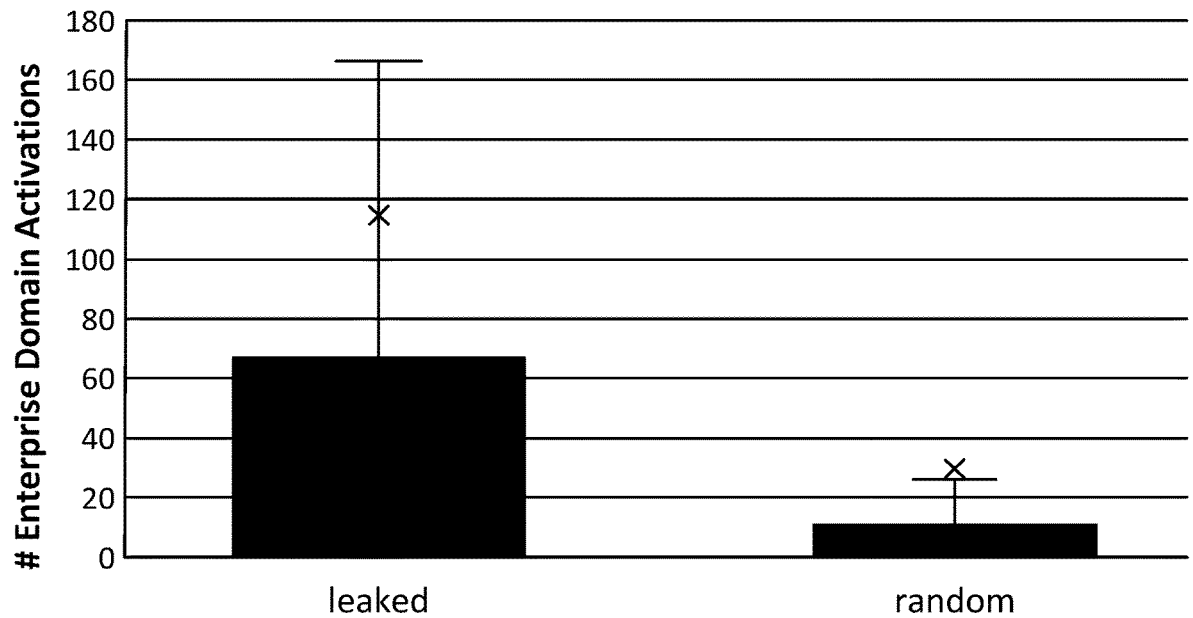

FIG. 10G provides a comparison of the enterprise_domain_cnt input variable between leaked and random SNs. Interestingly, leaked SNs also generally exhibit a higher number of enterprise domain email addresses that request activation. This may be due to the fact that a list of known free domain names is used to determine if a domain is free. If the domain is not found on the list, then it is considered to be an enterprise domain. Accordingly, many of the enterprise counts for the leaked SNs may actually be free domains that just weren't found on the list.

Figure 10H:
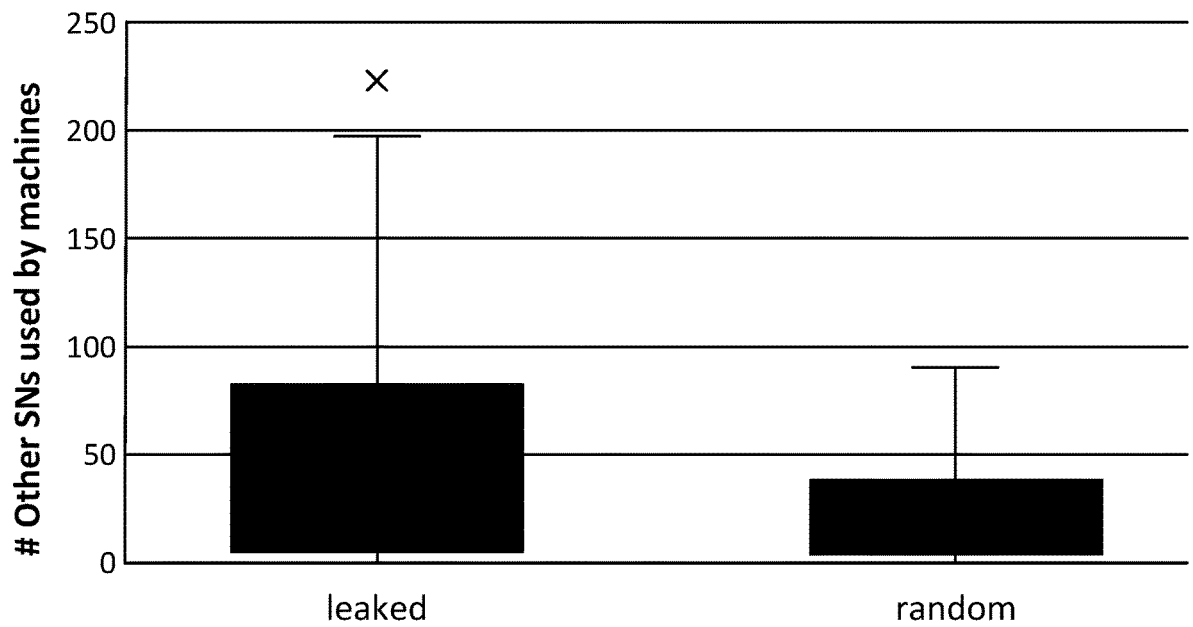

FIG. 10H provides a comparison of the sister_serials input variable between leaked and random SNs. In general, machines using the leaked SNs also use a higher number of other SNs.

Figure 10I:
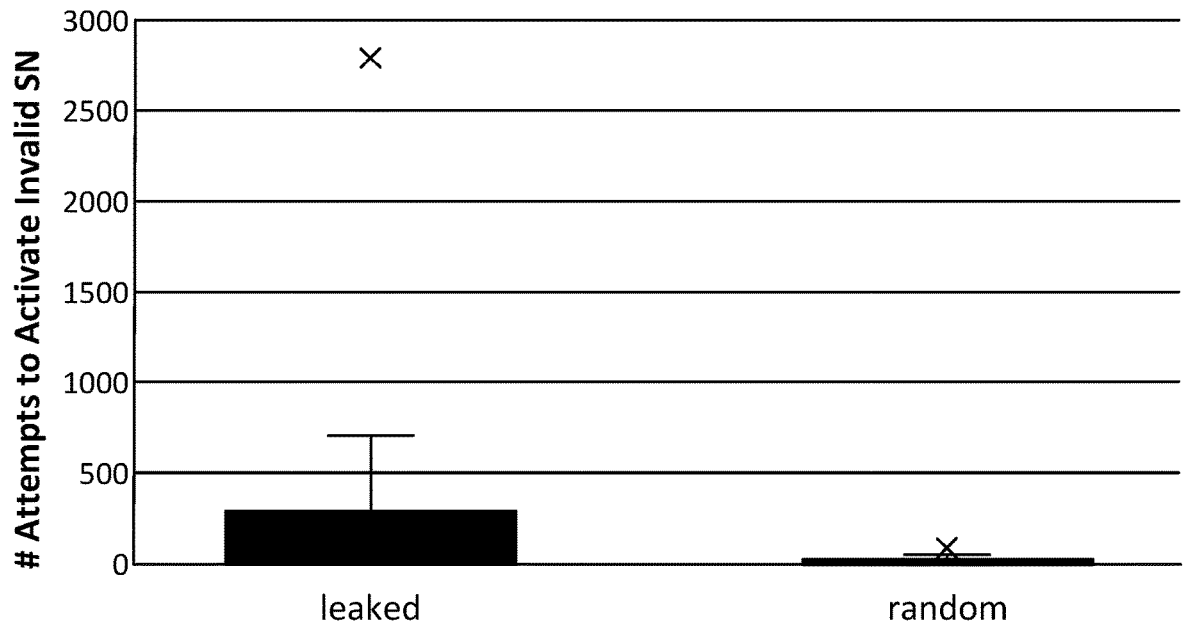

FIG. 10I provides a comparison of the invalid_serial_failed_activation_attempt input variable between leaked and random SNs. In general, machines using the leaked SNs have a higher number of attempts made to activate an invalid SN.

Figure 10J:
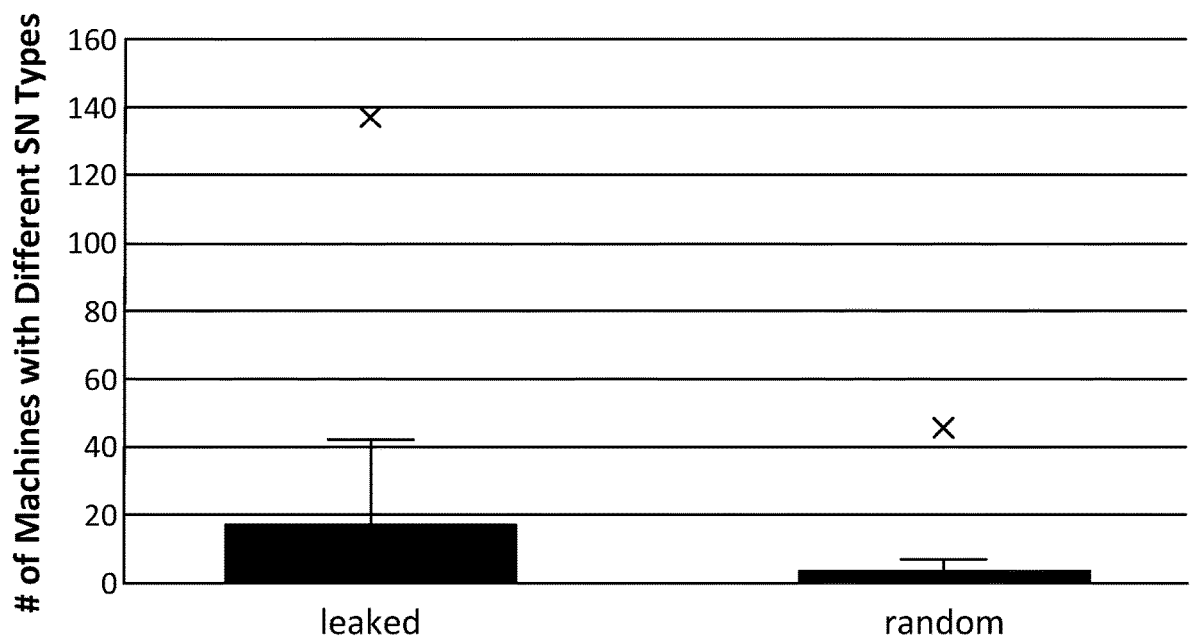

FIG. 10J provides a comparison of the cross_program_type_cnt input variable between leaked and random SNs. In general, a higher number of machines using the leaked SNs also use other SNs for different program types (e.g., education, government, commercial, or corporate).

Figure 10K:
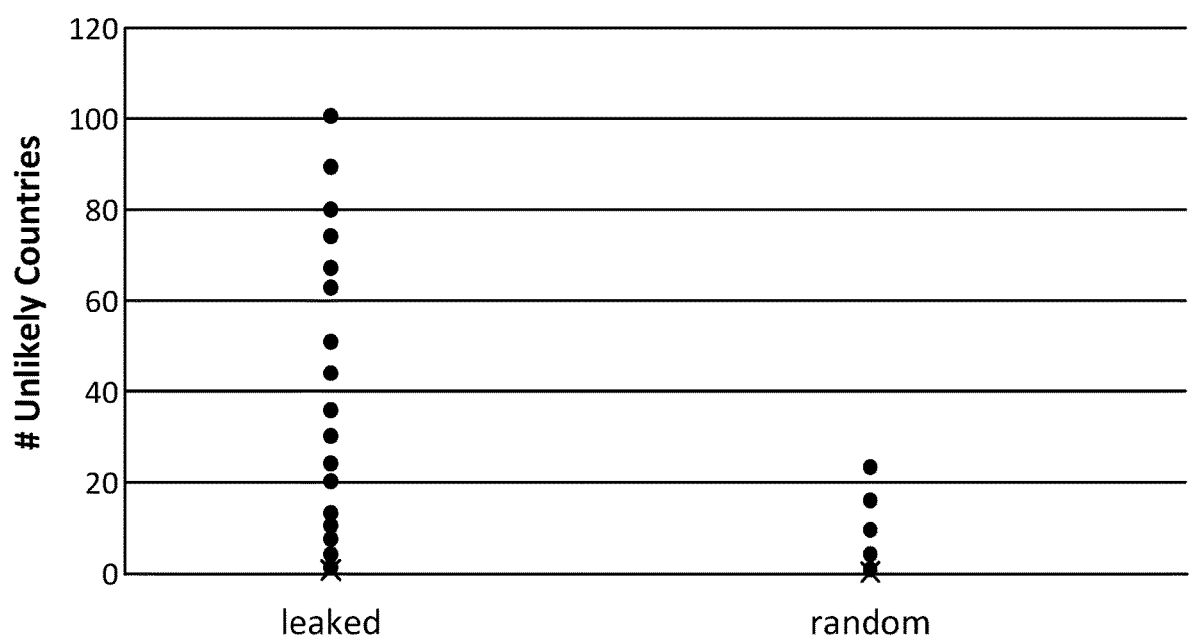

FIG. 10K provides a comparison of the unlikely_countries input variable between leaked and random SNs. In general, both the leaked and random SNs exhibit very low unlikely country counts. However, there are more and higher outliers in the leaked SNs compared to the random SNs.

Further Examples

Example 1 is a method for identifying a leaked serial number associated with a software product. The method includes tracking a plurality of characteristic parameters for activation events that occur over a period of time, wherein an activation event corresponds to a software activation request using a given serial number, each of the characteristic parameters being trackable for the given serial number and corresponding to an aspect of the activation events; generating a plurality of input variables associated with the given serial number, each of the input variables based on one or more of the plurality of characteristic parameters, wherein at least one of the input variables includes a count corresponding to a number of activation events associated with one of the characteristic parameters; providing the plurality of input variables as inputs to a neural network; generating, using the neural network, a leakage probability for the given serial number based on the inputs; and in response to the leakage probability being above a threshold, generating an alert indicating that the leakage probability is above the threshold.

Example 2 includes the subject matter of Example 1, further comprising causing additional activation requests made using the given serial number to be rejected.

Example 3 includes the subject matter of Example 1 or 2, further comprising generating a report that includes at least the leakage probability and a date corresponding to when the leakage probability was generated.

Example 4 includes the subject matter of any one of Examples 1-3, wherein the plurality of input variables includes any one or more of: a number of unique machines that activated the given serial number, a number of unique cities where the given serial number was activated, a number of unique countries where the given serial number was activated, a number of unique IP addresses that activated the given serial number, or a number of machines on average per each of the unique IP addresses.

Example 5 includes the subject matter of any one of Examples 1-4, further comprising generating a sparse collection of activation events by identifying those activation events occurring in a city where the total number of activation events from that city is less than a threshold percentage of the total number of all activation events.

Example 6 includes the subject matter of Example 5, wherein generating the plurality of input variables comprises generating one or more sparse input variables associated with the given serial number based on one or more of the characteristic parameters from the sparse collection of activation events.

Example 7 includes the subject matter of any one of Examples 1-6, further comprising determining one or more country affinity scores between a first country and one or more second countries by determining, for each of the one or more second countries, a total number of unique serial numbers activated in both the first country and the second country, divided by a total number of unique serial numbers activated in the first country but not in the second country.

Example 8 includes the subject matter of Example 7, wherein generating the plurality of input variables comprises generating an unlikely country variable by: identifying one or more country pairs from a list of countries where the activation events occurred; identifying the one or more country affinity scores associated with the one or more country pairs; and determining a number of country pairs having an affinity score below an affinity threshold, the resulting number of country pairs being the unlikely country variable.

Example 9 includes the subject matter of any one of Examples 1-8, wherein the plurality of input variables includes a total count of bad machine IDs, and wherein generating the plurality of input variables comprises identifying the total count of bad machine IDs, each of the bad machine IDs representing a machine that is known to have been associated with a given number of other leaked serial numbers.

Example 10 includes the subject matter of any one of Examples 1-9, wherein the activation events are first activation events, the period of time is a first period of time, the plurality of input variables is a first plurality of input variables, and the leakage probability is a first leakage probability associated with the first predetermined period of time, the method comprising: tracking the plurality of characteristic parameters for second activation events that occur over a second period of time that is after, and does not overlap with, the first period of time; generating a second plurality of input variables associated with the given serial number, each of the second input variables based on one or more of the plurality of characteristic parameters, at least one of the second input variables including a count corresponding to a number of activation events associated with one of the characteristic parameters; providing the first plurality of input variables and the second plurality of input variables as inputs to the neural network; generating, using the neural network, a second leakage probability for the given serial number; and in response to a difference between the second leakage probability and the first leakage probability being above a difference threshold, generating an alert indicating that the difference between the second leakage probability and the first leakage probability is above the difference threshold.

Example 11 is a system configured to identify a leaked serial number associated with a software product. The system includes at least one processor and a plurality of modules configured to be executed by the at least one processor. The plurality of modules include an event collection module, a variable generation module, a leakage detection module, and an output module. The event collection module is configured to track a plurality of characteristic parameters for activation events that occur over a period of time, wherein an activation event corresponds to a software activation request using a given serial number, each of the characteristic parameters being trackable for the given serial number and corresponding to an aspect of the activation event. The variable generation module is configured to generate a plurality of input variables associated with the given serial number, each of the input variables based on one or more of the plurality of characteristic parameters, wherein at least one of the input variables includes a count corresponding to a number of activation events associated with one of the characteristic parameters. The leakage detection module is configured to provide the plurality of input variables as inputs to a neural network, and generate, using the neural network, a leakage probability for the given serial number based on the inputs. The output module is configured to in response to the leakage probability being above a threshold, generate an alert indicating that the leakage probability is above the threshold.

Example 12 includes the subject matter of Example 11, wherein the event collection module is further configured to cause additional activation requests made using the given serial number to be rejected.

Example 13 includes the subject matter of Example 11 or 12, wherein the output module is further configured to generate a report that includes at least the leakage probability and a date corresponding to when the leakage probability was generated.

Example 14 includes the subject matter of any one of Examples 11-13, wherein the plurality of input variables includes any one or more of: a number of unique machines that activated the given serial number, a number of unique cities where the given serial number was activated, a number of unique countries where the given serial number was activated, a number of unique IP addresses that activated the given serial number, or a number of machines on average per each of the unique IP addresses.

Example 15 includes the subject matter of any one of Examples 11-14, wherein the variable generation module is configured to generate a sparse collection of activation events by identifying those activation events occurring in a city where the total number of activation events from that city is less than a threshold percentage of the total number of all activation events.

Example 16 includes the subject matter of Example 15, wherein the variable generation module is configured to generate one or more sparse input variables associated with the given serial number based on one or more of the characteristic parameters from the sparse collection of activation events.

Example 17 includes the subject matter of any one of Examples 11-16, wherein the variable generation module is further configured to determine one or more country affinity scores between a first country and one or more second countries by determining, for each of the one or more second countries, a total number of unique serial numbers activated in both the first country and the second country, divided by a total number of unique serial numbers activated in the first country but not in the second country.

Example 18 includes the subject matter of Example 17, wherein the variable generation module is configured to generate an unlikely country variable by: identifying one or more country pairs from a list of countries where the activation events occurred; identifying the one or more country affinity scores associated with the one or more country pairs; and determining a number of country pairs having an affinity score below an affinity threshold, the resulting number of country pairs being the unlikely country variable.

Example 19 includes the subject matter of any one of Examples 11-18, wherein the plurality of input variables includes a total count of bad machine IDs, and wherein the variable generation module is configured to identify the total count of bad machine IDs, each of the bad machine IDs representing a machine that is known to have been associated with a given number of other leaked serial numbers.

Example 20 includes the subject matter of any one of Examples 11-19, wherein the activation events are first activation events, the period of time is a first period of time, the plurality of input variables is a first plurality of input variables, and the leakage probability is a first leakage probability associated with the first predetermined period of time, wherein: the event collection module is configured to track the plurality of characteristic parameters for second activation events that occur over a second period of time that is after, and does not overlap with, the first period of time; the variable generation module is configured to generate a second plurality of input variables associated with the given serial number, each of the second input variables based on one or more of the plurality of characteristic parameters, at least one of the second input variables including a count corresponding to a number of activation events associated with one of the characteristic parameters; the leakage detection module is configured to provide the first plurality of input variables and the second plurality of input variables as inputs to the neural network, and generate, using the neural network, a second leakage probability for the given serial number; and the output module is configured to, in response to a difference between the second leakage probability and the first leakage probability being above a difference threshold, generate an alert indicating that the difference between the second leakage probability and the first leakage probability is above the difference threshold.

Example 21 is a computer program product including one or more non-transitory machine-readable media having instructions encoded thereon that when executed by at least one processor causes a process for identifying a leaked serial number. The process includes tracking a plurality of characteristic parameters for activation events that occur over a period of time, wherein an activation event corresponds to a software activation request using a given serial number, each of the characteristic parameters being trackable for the given serial number and corresponding to an aspect of the activation events; generating a plurality of input variables associated with the given serial number, each of the input variables based on one or more of the plurality of characteristic parameters, wherein at least one of the input variables includes a count corresponding to a number of activation events associated with one of the characteristic parameters; generating, using a neural network, a leakage probability for the given serial number based on the plurality of input variables; and in response to the leakage probability being above a threshold, generating an alert indicating that the leakage probability is above the threshold.

Example 22 includes the subject matter of Example 21, the process further comprising causing additional activation requests made using the given serial number to be rejected.

Example 23 includes the subject matter of Example 21 or 22, wherein the process further comprises generating a report that includes at least the leakage probability and a date corresponding to when the leakage probability was generated.

Example 24 includes the subject matter of any one of Examples 21-23, wherein the plurality of input variables includes any one or more of: a number of unique machines that activated the given serial number, a number of unique cities where the given serial number was activated, a number of unique countries where the given serial number was activated, a number of unique IP addresses that activated the given serial number, or a number of machines on average per each of the unique IP addresses.

Example 25 includes the subject matter of any one of Examples 21-24, wherein the process further comprises generating a sparse collection of activation events by identifying those activation events occurring in a city where the total number of activation events from that city is less than a threshold percentage of the total number of all activation events.

Example 26 includes the subject matter of Example 25, wherein generating the plurality of input variables comprises generating one or more sparse input variables associated with the given serial number based on one or more of the characteristic parameters from the sparse collection of activation events.

Example 27 includes the subject matter of any one of Examples 21-26, wherein the process further comprises determining one or more country affinity scores between a first country and one or more second countries by determining, for each of the one or more second countries, a total number of unique serial numbers activated in both the first country and the second country, divided by a total number of unique serial numbers activated in the first country but not in the second country.

Example 28 includes the subject matter of Example 27, wherein generating the plurality of input variables comprises generating an unlikely country variable by: identifying one or more country pairs from a list of countries where the activation events occurred; identifying the one or more country affinity scores associated with the one or more country pairs; and determining a number of country pairs having an affinity score below an affinity threshold, the resulting number of country pairs being the unlikely country variable.

Example 29 includes the subject matter of any one of Examples 21-28, wherein the plurality of input variables includes a total count of bad machine IDs, and wherein generating the plurality of input variables comprises identifying the total count of bad machine IDs, each of the bad machine IDs representing a machine that is known to have been associated with a given number of other leaked serial numbers.

Example 30 includes the subject matter of any one of Examples 21-29, wherein the activation events are first activation events, the period of time is a first period of time, the plurality of input variables is a first plurality of input variables, and the leakage probability is a first leakage probability associated with the first predetermined period of time, the process comprising: tracking the plurality of characteristic parameters for second activation events that occur over a second period of time that is after, and does not overlap with, the first period of time; generating a second plurality of input variables associated with the given serial number, each of the second input variables based on one or more of the plurality of characteristic parameters, at least one of the second input variables including a count corresponding to a number of activation events associated with one of the characteristic parameters; providing the first plurality of input variables and the second plurality of input variables as inputs to the neural network; generating, using the neural network, a second leakage probability for the given serial number; and in response to a difference between the second leakage probability and the first leakage probability being above a difference threshold, generating an alert indicating that the difference between the second leakage probability and the first leakage probability is above the difference threshold.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for identifying a leaked serial number associated with a software product, the method comprising:
   determining one or more country affinity scores between a first country and one or more second countries by determining, for each of the one or more second countries, a total number of unique serial numbers used in both the first country and the second country, divided by a total number of unique serial numbers used in the first country but not in the second country;
   receiving data characterizing a plurality of activation events, wherein each activation event corresponds to a software activation request using a particular serial number;
   identifying a plurality of characteristic parameters for each of the activation events that occur over a period of time, wherein each of the characteristic parameters characterizes an aspect of one or more of the activation events;
   identifying a threshold quantity of the plurality of activation events that are characterized by a particular characteristic parameter;
   identifying a sparse subset of the plurality of activation events, wherein the sparse subset includes a quantity of infrequent activation events that (a) occur during the period of time, and (b) are characterized by the particular characteristic parameter, wherein the quantity of infrequent activation events in the sparse subset is less than the threshold quantity;
   generating a plurality of input variables associated with the particular serial number, the plurality of input variables including
   a direct feature input variable that includes a first count corresponding to a number of the plurality of activation events that occur during the period of time and that are characterized by a first one of the characteristic parameters, and
   a sparse input variable that includes a second count corresponding to a number of the plurality of activation events in the sparse subset that occur during the period of time and that are characterized by a second one of the characteristic parameters;
   providing the direct feature input variable and the sparse input variable as inputs to a neural network;
   generating, using the neural network, a leakage probability for the particular serial number;

in response to the leakage probability being above a threshold probability, generating an alert indicating that the leakage probability is above the threshold probability; and in response to the leakage probability being above the threshold probability, causing additional activation requests made using the particular serial number to be rejected.

2. The method of claim 1, further comprising generating a report that includes at least the leakage probability and a date corresponding to when the leakage probability was generated.

3. The method of claim 1, wherein the plurality of input variables includes one or more of:
a number of unique machines that received at least one of the plurality of activation events,
a number of unique cities where at least one of the plurality of activation events occurred,
a number of unique countries where at least one of the plurality of activation events occurred,
a number of unique IP addresses associated with at least one of the plurality of activation events, or
a number of machines on average per each of the unique IP addresses.

4. The method of claim 1, further comprising identifying the sparse subset by identifying activation events occurring in a city where a total number of activation events from the city is less than a threshold percentage of a total number of the plurality of activation events.

5. The method of claim 1, wherein generating the plurality of input variables comprises generating an unlikely country variable by:
identifying a plurality of countries where the activation events occurred; and
setting the unlikely country variable to a number of the one or more second countries having a country affinity score below an affinity threshold.

6. The method of claim 1, wherein the plurality of input variables includes a total count of bad machine identifiers, and wherein generating the plurality of input variables comprises identifying the total count of bad machine identifiers, each of the bad machine identifiers representing a machine that is known to have been associated with a given number of other leaked serial numbers.

7. The method of claim 1, wherein the plurality of activation events is a first plurality of activation events, the period of time is a first period of time, the plurality of input variables is a first plurality of input variables, and the leakage probability is a first leakage probability associated with the first period of time, the method further comprising:
identifying the plurality of characteristic parameters for the particular serial number for a second plurality of activation events that occur over a second period of time that is after, and does not overlap with, the first period of time;
generating a second plurality of input variables associated with the particular serial number, the second plurality of input variables including
a third input variable that includes a third count corresponding to a number of the second plurality of activation events that occur during the second period of time and that are characterized by a third one of the characteristic parameters, and
a fourth input variable that includes a fourth count corresponding to a number of the second plurality of activation events that occur during the second period of time and that are characterized by a fourth one of the characteristic parameters;
providing the first plurality of input variables and the second plurality of input variables to the neural network;
generating, using the neural network, a second leakage probability for the particular serial number; and
in response to a difference between the second leakage probability and the first leakage probability being above a difference threshold, generating an alert indicating that the difference between the second leakage probability and the first leakage probability is above the difference threshold.

8. A system configured to identify a leaked serial number associated with a software product, the system comprising:
a non-transitory computer readable medium;
at least one processor;
an event collection module, stored in the non-transitory computer readable medium, executable by the at least one processor, and configured to
receive data characterizing a plurality of activation events, wherein each activation event corresponds to a software activation request using a particular serial number, and
identify a plurality of characteristic parameters for each of the activation events that occur over a period of time, wherein each of the characteristic parameters characterizes an aspect of one or more of the activation events;
a variable generation module, stored in the non-transitory computer readable medium, executable by the at least one processor, and configured to
determine one or more country affinity scores between a first country and one or more second countries by determining, for each of the one or more second countries, a total number of unique serial numbers used in both the first country and the second country, divided by a total number of unique serial numbers used in the first country but not in the second country,
identify a threshold quantity of the plurality of activation events that are characterized by a particular characteristic parameter,
identify a sparse subset of the plurality of activation events, wherein the sparse subset includes a quantity of infrequent activation events that (a) occur during the period of time, and (b) are characterized by the particular characteristic parameter, wherein the quantity of infrequent activation events in the sparse subset is less than the threshold quantity, and
generate a plurality of input variables associated with the particular serial number, the plurality of input variables including
a first input variable that includes a first count corresponding to a number of the plurality of activation events that occur during the period of time and that are characterized by a first one of the characteristic parameters, and
a second input variable that includes a second count corresponding to a number of the plurality of activation events in the sparse subset that occur during the period of time and that are characterized by a second one of the characteristic parameters;
a leakage detection module, stored in the non-transitory computer readable medium, executable by the at least one processor, and configured to
provide the first and second input variables as inputs to a neural network, and generate, using the neural network, a leakage probability for the particular serial number; and an output module, stored in the non-transitory computer readable medium, executable by the at least one processor, and configured to, in response to the leakage probability being above a threshold probability, generate an alert indicating that the leakage probability is above the threshold probability;

wherein the event collection module is further configured to, in response to the leakage probability being above the threshold probability, cause additional activation requests made using the particular serial number to be rejected.

9. The system of claim 8, wherein the output module is further configured to generate a report that includes at least the leakage probability and a date corresponding to when the leakage probability was generated.

10. The system of claim 8, wherein the plurality of input variables includes one or more of:
a number of unique machines that received at least one of the plurality of activation events,
a number of unique cities where at least one of the plurality of activation events occurred,
a number of unique countries where at least one of the plurality of activation events occurred,
a number of unique IP addresses associated with at least one of the plurality of activation events, or
a number of machines on average per each of the unique IP addresses.

11. The system of claim 8, wherein the variable generation module is configured to identify the sparse subset by identifying activation events occurring in a city where a total number of activation events from the city is less than a threshold percentage of a total number of the plurality of activation events.

12. The system of claim 8, wherein the variable generation module is configured to generate an unlikely country variable by:
identifying a plurality of countries where the activation events occurred; and
setting the unlikely country variable to a number of the one or more second countries having a country affinity score below an affinity threshold.

13. The system of claim 8, wherein the plurality of activation events is a first plurality of activation events, the period of time is a first period of time, the plurality of input variables is a first plurality of input variables, and the leakage probability is a first leakage probability associated with the first period of time, wherein:
the event collection module is configured to identify the plurality of characteristic parameters for the particular serial number for a second plurality of activation events that occur over a second period of time that is after, and does not overlap with, the first period of time;
the variable generation module is configured to generate a second plurality of input variables associated with the particular serial number, the second plurality of input variables including
a third input variable that includes a third count corresponding to a number of the second plurality of activation events that occur during the second period of time and that are characterized by a third one of the characteristic parameters, and
a fourth input variable that includes a fourth count corresponding to a number of the second plurality of activation events that occur during the second period of time and that are characterized by a fourth one of the characteristic parameters;
the leakage detection module is configured to
provide the first plurality of input variables and the second plurality of input variables to the neural network, and
generate, using the neural network, a second leakage probability for the particular serial number; and
the output module is configured to, in response to a difference between the second leakage probability and the first leakage probability being above a difference threshold, generate an alert indicating that the difference between the second leakage probability and the first leakage probability is above the difference threshold.

14. A computer program product including one or more non-transitory machine-readable media having instructions encoded thereon that when executed by at least one processor causes a process for identifying a leaked serial number, the process comprising:
determining one or more country affinity scores between a first country and one or more second countries by determining, for each of the one or more second countries, a total number of unique serial numbers used in both the first country and the second country, divided by a total number of unique serial numbers used in the first country but not in the second country;
receiving data characterizing a plurality of activation events, wherein each activation event corresponds to a software activation request using a particular serial number;
identifying a plurality of characteristic parameters for each of the activation events that occur over a period of time, wherein each of the characteristic parameters characterizes an aspect of one or more of the activation events;
generating a plurality of input variables associated with the particular serial number, the plurality of input variables including
a first input variable that includes a first count corresponding to a number of the plurality of activation events that occur during the period of time and that are characterized by use of at least one of a plurality of bad machine identifiers, wherein each of the bad machine identifiers represents a machine that is known to have been associated with a quantity of other leaked serial numbers, and
a second input variable that includes a second count corresponding to a number of the plurality of activation events that occur during the period of time and that are characterized by a second one of the characteristic parameters;
generating, using a neural network, a leakage probability for the particular serial number based on at least some of the plurality of input variables;
in response to the leakage probability being above a threshold probability, generating an alert indicating that the leakage probability is above the threshold probability; and
in response to the leakage probability being above the threshold probability, causing additional activation requests made using the particular serial number to be rejected.

15. The computer program product of claim 14, wherein the process further comprises:

identifying a threshold quantity of the plurality of activation events that are characterized by a particular characteristic parameter; and identifying a sparse subset of the plurality of activation events, wherein the sparse subset includes a quantity of infrequent activation events that (a) occur during the period of time, and (b) are characterized by the particular characteristic parameter, wherein the quantity of infrequent activation events in the sparse subset is less than the threshold quantity.

16. The computer program product of claim 14, wherein:

the process further comprises identifying a threshold quantity of the plurality of activation events that are characterized by a particular characteristic parameter;

the process further comprises identifying a sparse subset of the plurality of activation events, wherein the sparse subset includes a quantity of infrequent activation events that (a) occur during the period of time, and (b) are characterized by the particular characteristic parameter, wherein the quantity of infrequent activation events in the sparse subset is less than the threshold quantity; and the second count corresponds to a number of the plurality of activation events in the sparse subset that occur during the period of time and that are characterized by the second one of the characteristic parameters.

* * * * *